US006862585B2

(12) United States Patent
Planalp et al.

(10) Patent No.: US 6,862,585 B2
(45) Date of Patent: Mar. 1, 2005

(54) SYSTEM AND METHOD FOR MANAGING PRODUCT DEVELOPMENT

(75) Inventors: John Eugene Planalp, Wyoming, OH (US); Suzanne Miranda Kopcha, Cincinnati, OH (US); Joseph Fernand Deflander, Wespelaar (BE)

(73) Assignee: The Procter & Gamble Company, Cincinnati, OH (US)

( * ) Notice: Subject to any disclaimer, the term of this patent is extended or adjusted under 35 U.S.C. 154(b) by 226 days.

(21) Appl. No.: 09/805,791

(22) Filed: Mar. 14, 2001

(65) Prior Publication Data

US 2002/0143726 A1 Oct. 3, 2002

Related U.S. Application Data

(60) Provisional application No. 60/256,817, filed on Dec. 19, 2000.

(51) Int. Cl.7 ................................................ G06F 17/30
(52) U.S. Cl. ................................ 707/1; 705/7; 705/10
(58) Field of Search ................. 707/1, 104.1, 200–202; 705/7, 10

(56) References Cited

U.S. PATENT DOCUMENTS 4,646,238 A 2/1987 Carlson, Jr. et al.
5,208,765 A * 5/1993 Turnbull ...................... 702/84
5,231,567 A 7/1993 Matoba et al.
5,311,424 A * 5/1994 Mukherjee et al. ........... 705/29
5,311,438 A 5/1994 Sellers et al.
5,634,101 A 5/1997 Blau
5,646,862 A * 7/1997 Jolliffe et al. .................. 703/1
5,664,109 A * 9/1997 Johnson et al. ................ 705/2
5,745,390 A * 4/1998 Daneshgari ................. 702/119
5,767,848 A 6/1998 Matsuzaki et al.
5,864,480 A 1/1999 Ladd
5,970,476 A * 10/1999 Fahey ......................... 705/28
5,999,908 A 12/1999 Abelow
6,006,022 A 12/1999 Rhim et al.
6,006,195 A 12/1999 Marchak et al.
6,032,123 A 2/2000 Jameson
6,036,345 A 3/2000 Jannette et al.
6,038,517 A 3/2000 Dobbins et al.
6,044,354 A 3/2000 Asplen, Jr.
6,047,290 A 4/2000 Kennedy et al.

(List continued on next page.)

FOREIGN PATENT DOCUMENTS

| | | | |
|---|---|---|---|
| EP | 0 488 246 | B1 | 6/1992 |
| EP | 0 639 815 | A2 | 2/1995 |
| EP | 0 895 171 | A2 | 2/1999 |
| JP | 7016837 | | 1/1995 |
| JP | 10171871 | | 6/1998 |
| WO | WO 00/16228 | | 3/2000 |
| WO | WO 00/19345 | | 4/2000 |

*Primary Examiner*—Uyen Le
*Assistant Examiner*—Hanh Thai
(74) *Attorney, Agent, or Firm*—Leonard W. Lewis

(57) ABSTRACT

A system, method, and computer readable storage medium for managing product development include a relational database containing draft, approved, and archived versions of product, package, materials, process, and artwork technical data for use by product development personnel in providing a structured set of data output for use in a supply chain. In one embodiment, the relational database includes objects having data to describe design requirements of a finished product component such as a formula, material, package, and the like. Text documents may be linked to the relational data structure by reference to provide design requirements not amenable to a structured data format, such as test methods, process instructions, and the like. The system, method, and computer readable storage medium provide for electronic communication and electronic approval of data subsets while tracking changes and archiving previous versions for subsequent access or reference. System validation and ongoing change control provide necessary support for products in regulated industries.

72 Claims, 33 Drawing Sheets

U.S. PATENT DOCUMENTS 6,052,693 A * 4/2000 Smith et al. ............. 707/104.1
6,070,143 A 5/2000 Barney et al.
6,256,773 B1 * 7/2001 Bowman-Amuah ......... 717/121
6,341,287 B1 * 1/2002 Sziklai et al. ............... 707/102
6,353,824 B1 * 3/2002 Boguraev et al. .............. 707/5
6,389,436 B1 * 5/2002 Chakrabarti et al. ........ 715/513
6,438,594 B1 * 8/2002 Bowman-Amuah ......... 709/225
6,505,191 B1 * 1/2003 Baclawski ..................... 707/3
6,625,616 B1 * 9/2003 Dragon et al. ........... 707/104.1

* cited by examiner

CSS

Log Out | Help | Customer Service | Customize | GCAS Search [  ] GO

Approved Standards \ Originator \ Peer Reviewer \ Approver \ Standards Office \ Maintenance Prototype database
ACTIONS: ( Copy to Revise )  ( Copy to Create New )

Master Packing Standard

GCAS: 13893244    Version: 002    Originator:

| General | Consumer | Customer | Transport | Reference Documents | Business Team | Plants | Status: | Individuals | Approved | Ownership |

General — 706

Components — 738

| Material GCAS Code | Description | Pack Size | UOM | Quantity | UOM | Comments |
|---|---|---|---|---|---|---|
| 13893086 | x500ml Crystal Bottle - Handdish | 500 | ML | 1.0 | | |
| 13893059 | x500ml Swirl shape transparent self adhesive label - clockwise winding | 0 | ML | 1.0 | | |
| 13893089 | xOne piece injection molded plastic screw-on flip-top closure | 0 | ML | 1.0 | | |
| 13893234 | x500ml Pear Shape opaque self adhesive label - clockwise winding | 500 | ML | 1.0 | | |

730 / 736 / 734 / 740 / 742 / 744 / 746 / 748

732 — Performance Specs

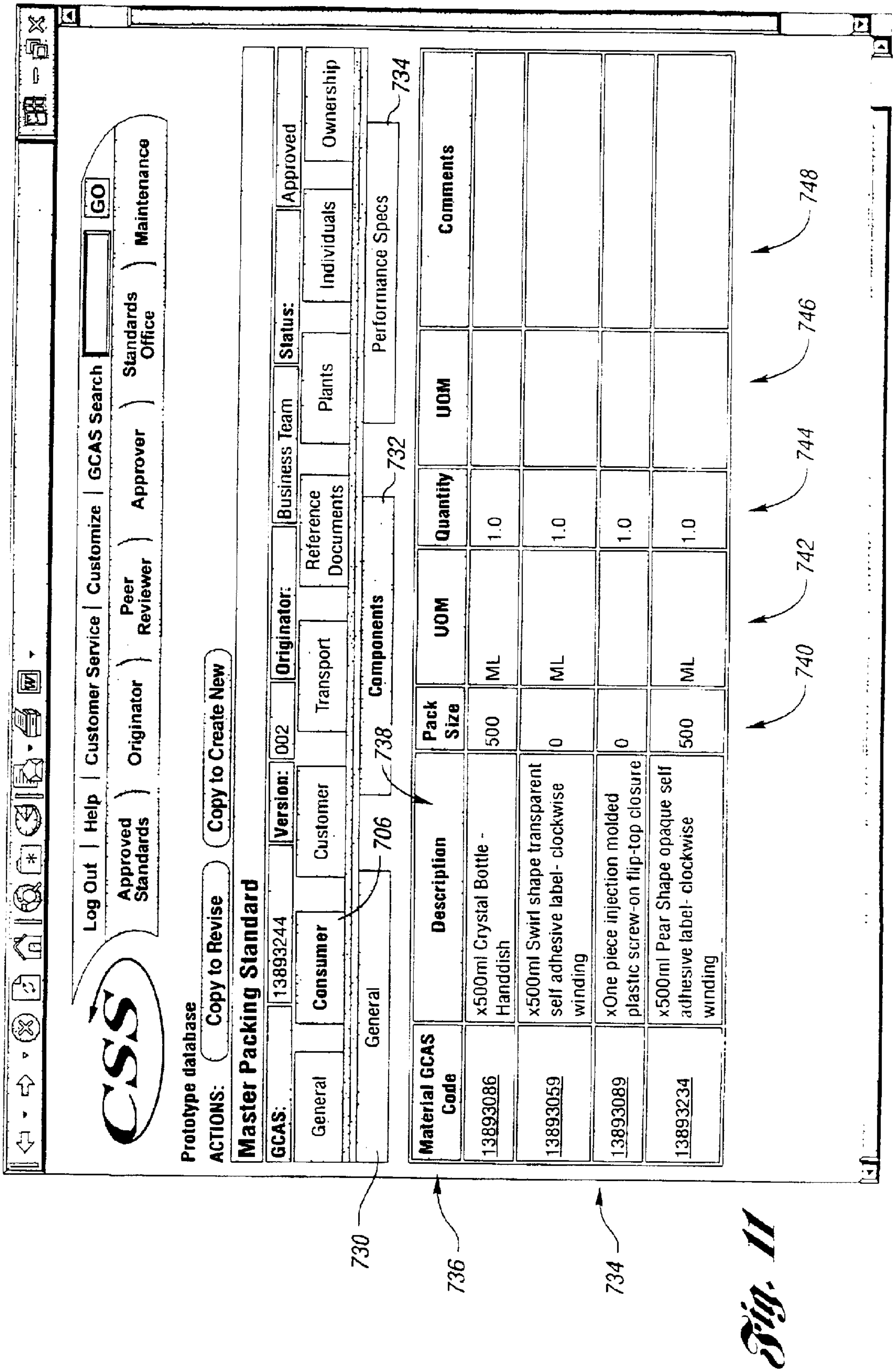

*Fig. 11*

CSS

Prototype database
ACTIONS: Copy to Revise | Copy to Create New
Individual Packing Standard

| | | | | | | | | |
|---|---|---|---|---|---|---|---|---|
| **GCAS:** | 13893476 | **Version:** | 002 | **Originator:** | Business Team | **Status:** | Approved | **Master:** 13893244 |

Log Out | Help | Customer Service | Customize | GCAS Search [ ] GO
Approved Standards | Originator | Peer Reviewer | Approver | Standards Office | Maintenance

| General | Consumer | Customer | Transport | Reference Documents | Approved | Plants | Ownership |

Description: x Germany 14 x 500ml Dawn von Fairy - Lemon
SAP Description: x Germany 14 x 500ml Dawn von Fairy - Lemon
Finished Product Code Base UOM: CS
Finished Product: 82000162
Brand Info: MR CLEAN-*~~*
Other Names/Info: Crystal Project
Technology: IN HOUSE BOTTLE BLOWING
Comments:
Last Updated Date: 07Dec2000

Lifecycle Status: PRODUCTION
Approval Date:
Effective Date: 27Jul2000
Expiration Date: 02Aug2000
FPC Description: Dawn von Fairy - Lemon
Reason for Change:
Local Code and Description: 1ONHD500LFM
Global Spec: Yes
Last Update User: Business Team

Supersede Information
Superseded By: [ ] Date Superseded on: [ ]

770
772
774
776

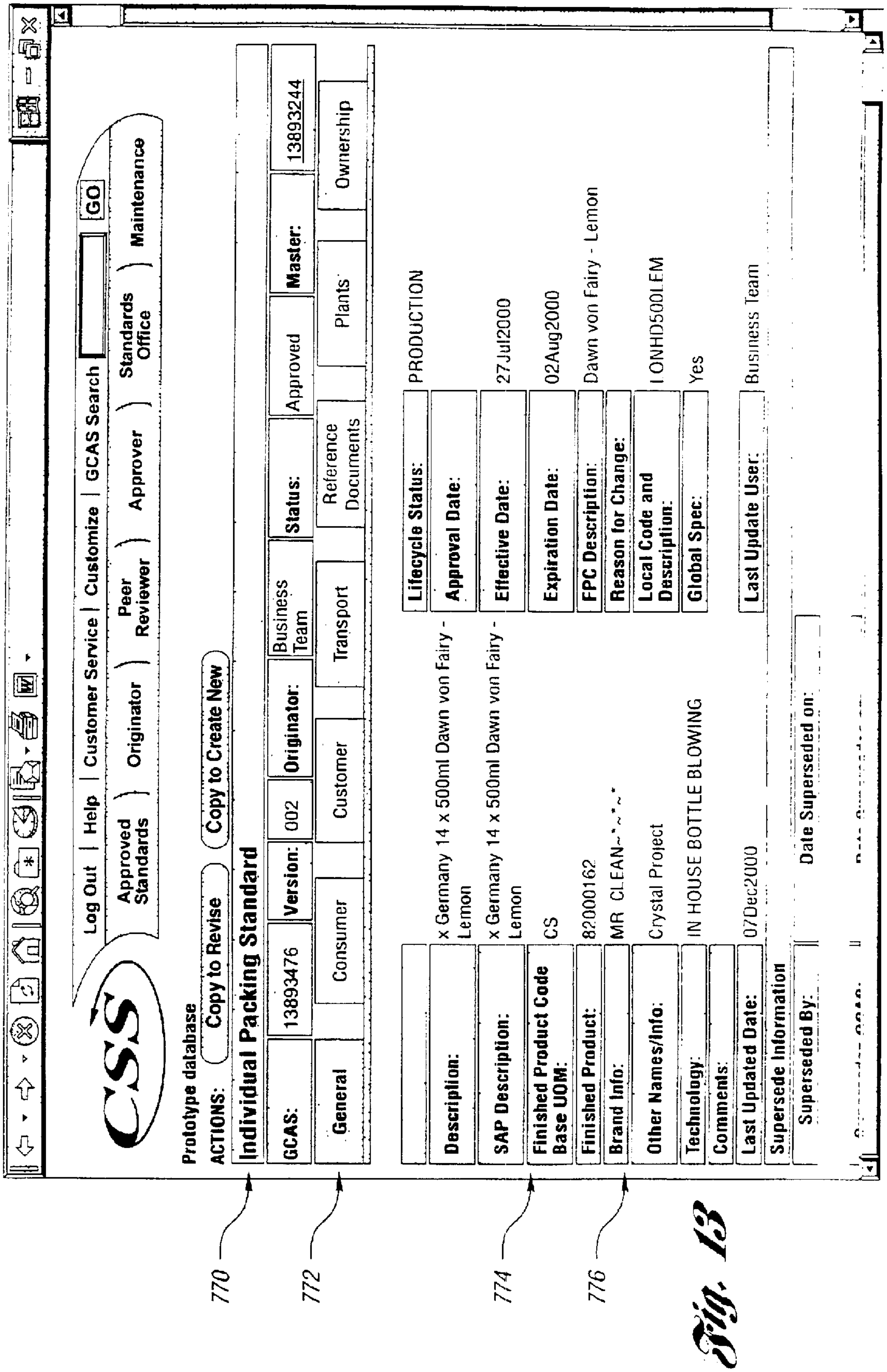

*Fig. 13*

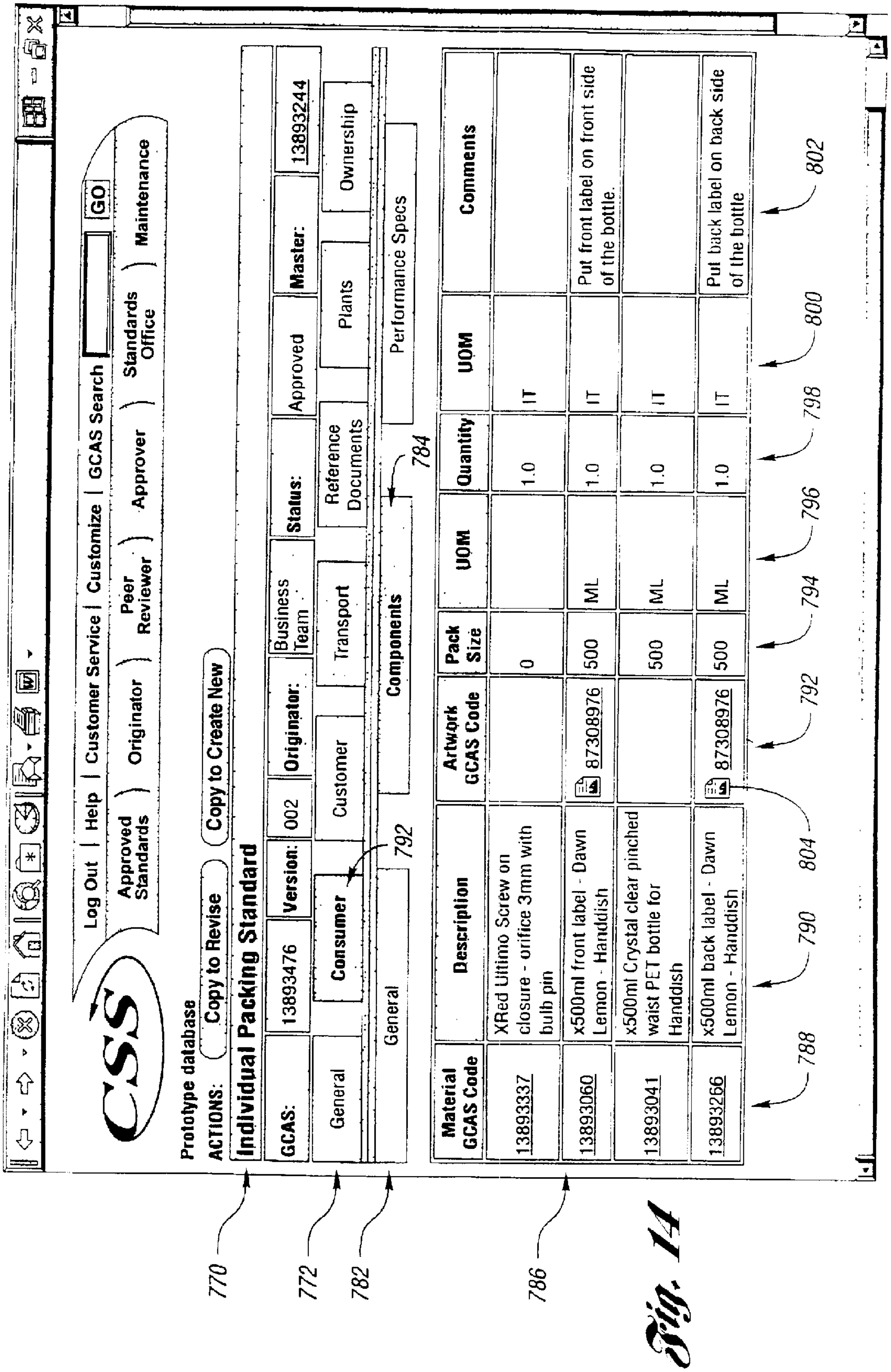

Fig. 14

| Material GCAS Code | Description | Artwork GCAS Code | Pack Size | UOM | Quantity | UOM | Comments |
|---|---|---|---|---|---|---|---|
| 13893337 | XRed Ultimo Screw on closure - orifice 3mm with bulb pin | | 0 | | 1.0 | IT | |
| 13893060 | x500ml front label - Dawn Lemon - Handdish | 87308976 | 500 | ML | 1.0 | IT | Put front label on front side of the bottle. |
| 13893041 | x500ml Crystal clear pinched waist PET bottle for Handdish | | 500 | ML | 1.0 | IT | |
| 13893266 | x500ml back label - Dawn Lemon - Handdish | 87308976 | 500 | ML | 1.0 | IT | Put back label on back side of the bottle |

CSS

Prototype database

ACTIONS: [ Copy to Revise ] [ Copy to Create New ]

Individual Packaging Standard

| GCAS: | 13893041 | Version: | 002 | Originator: | | Business Team | | Status: | Approved | Master: | 13893086 |

| General | Performance Specs | Sampling | Reference Documents | Plants | Ownership | Basis |

Test Method

| Characteristic | Report Type | LSL | LTGT | Target | USGT | USL | Unit Of Measure | Report to Nearest | Release Criteria |
|---|---|---|---|---|---|---|---|---|---|
| Appearance | Att | | | | | | | | Refer std sample |
| Cleanliness | Att | | | | | | | | Refer std sample and conditions outlined in spec. |
| Cleanliness | Att | | | | | | | | Count to match the ordered number |
| Block Dimensions | Var | 53.5 | 53.5 | 54.0 | 54.5 | 54.5 | mm | 0.1 | Crit with limits Cpk>1.33 |
| Block Dimensions | Var | 188.1 | 189.1 | 190.0 | 191.0 | 192.0 | mm | 0.1 | Crit with limits Cpk>1.33 |
| Weight | Var | 0.0 | 0.0 | 30.0 | 0.0 | 0.0 | G | 0.1 | 0% below spec required |
| Compression | Var | 0.0 | 0.0 | 230.0 | 0.0 | 280.0 | N | 5 | 0% below spec required |
| Overflow | Var | 0.0 | 530.0 | 535.0 | 540.0 | 0.0 | ML | 5 | Control & report |
| Block Dimensions | Var | 92.5 | 92.5 | 93.0 | 93.5 | 94.0 | mm | 0.1 | Crit with limits Cpk>1.33 |

Master Information

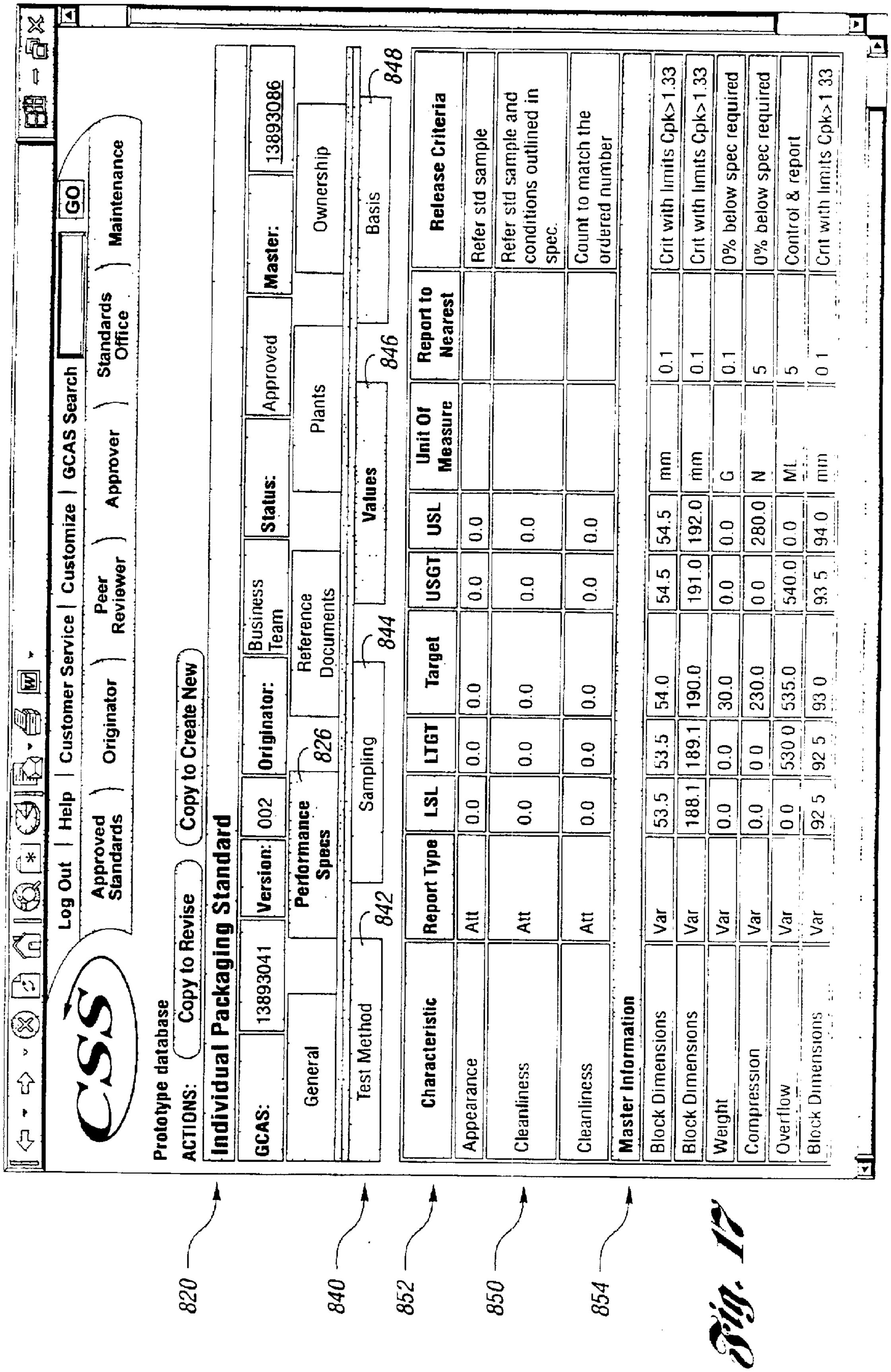

Fig. 17

Prototype database

ACTIONS: ( Copy to Revise ) ( Copy to Create New )

Individual Packaging Standard

| GCAS: | 13893041 | Version: 002 | Originator: | Business Team | Status: | Approved | Master: | 13893086 |

| General | Performance Specs | Reference Documents | | Plants | Ownership |

Test Method

| Characteristic | Sampling | Sampling | Subgroup | Values | Basis | Plant Testing |
|---|---|---|---|---|---|---|
| Appearance | 5 bottles per pallet | | | 5 | R | |
| Cleanliness | visual inspection of the samples checked for appearance | | | 5 | R | |
| Samples | Check every 5th pallet for count | | | 1/5 | | FR London only |
| **Master Information** | | | | | | |
| Block Dimension | one per cavity per hour | | | 3 | | R 5 |
| Block Dimension | one per cavity per hour | | | 3 | | R 5 |
| Weight | three per cavity per hour | | | 3 | | F 5 |
| Compression | three per cavity per hour | | | 5 | | F 5 |
| Overflow | one per cavity per hour | | | 5 | | F 5 |
| Block Dimension | one per cavity per hour | | | 3 | | R 5 |

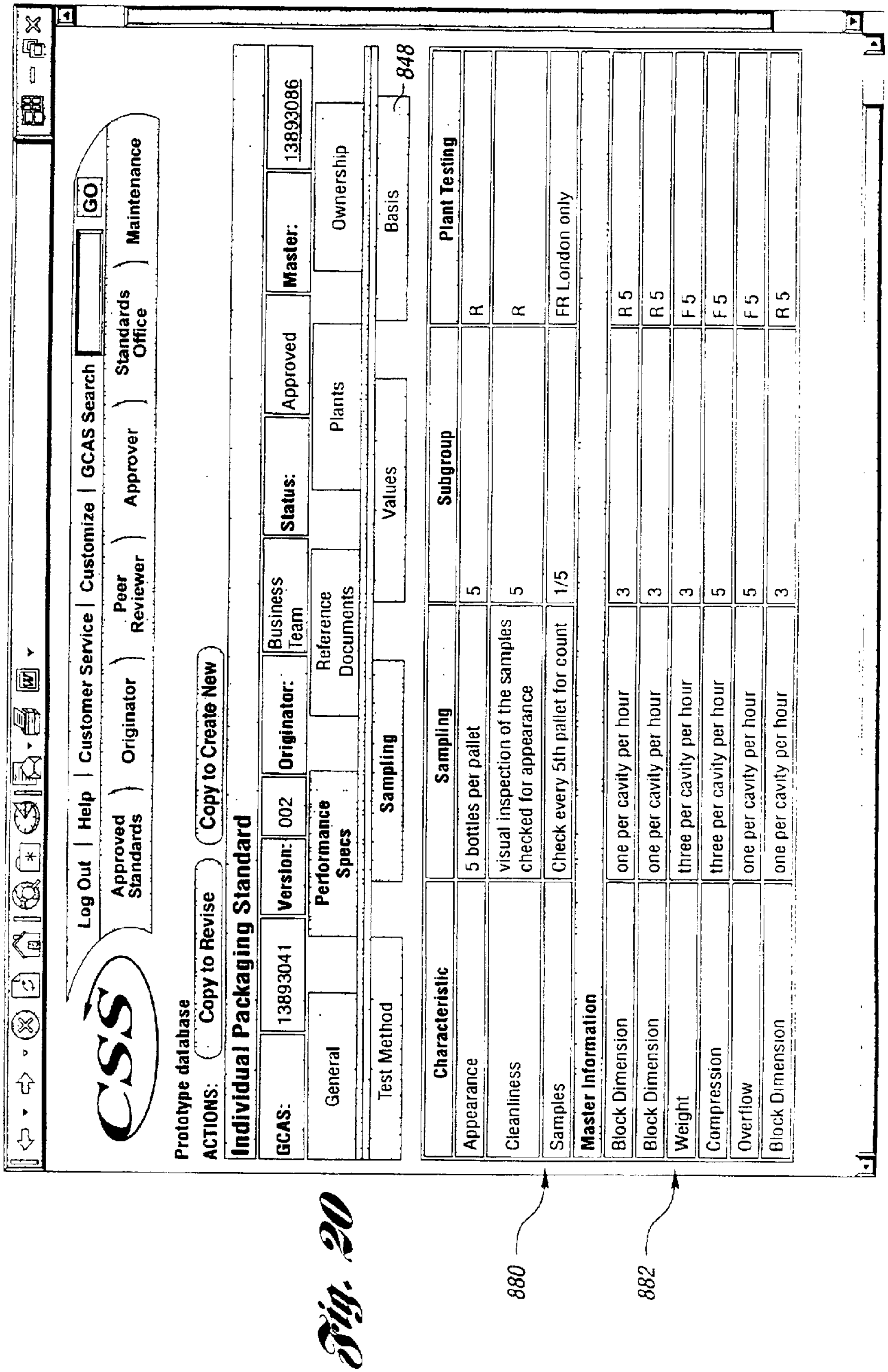

Fig. 20

Where Used information for Individual_Pack_material 13893041 002

| GCAS Code | Description | Finished Product Code | Brand Info |
|---|---|---|---|
| 13893476 | xGermany 14 x 500ml Dawn von Fairy Lemon | 82000162 | MR. CLEAN-*-*-* |
| 13893719 | xGermany 14 x 500ml Dawn von Fairy-Antibacterial | 82000170 | TIDE-LIQUID-*-*-* |
| 13893572 | xGermany 14 x 500ml Dawn von Fairy-Regular | 82000170 | TIDE-*-*-* |
| 13893719 | xGermany 14 x 500ml Dawn von Fairy-Antibacterial | | TIDE-LIQUID-*-*-* |
| 13893476 | xGermany 14 x 500ml Dawn von Fairy-Lemon | 82000162 | MR. CLEAN-*-*-* |

940 ← GCAS Code column
942 ← Description column
944 ← Finished Product Code column
946 ← Brand Info column Other Active Versions
GCAS:     Version:     Description:

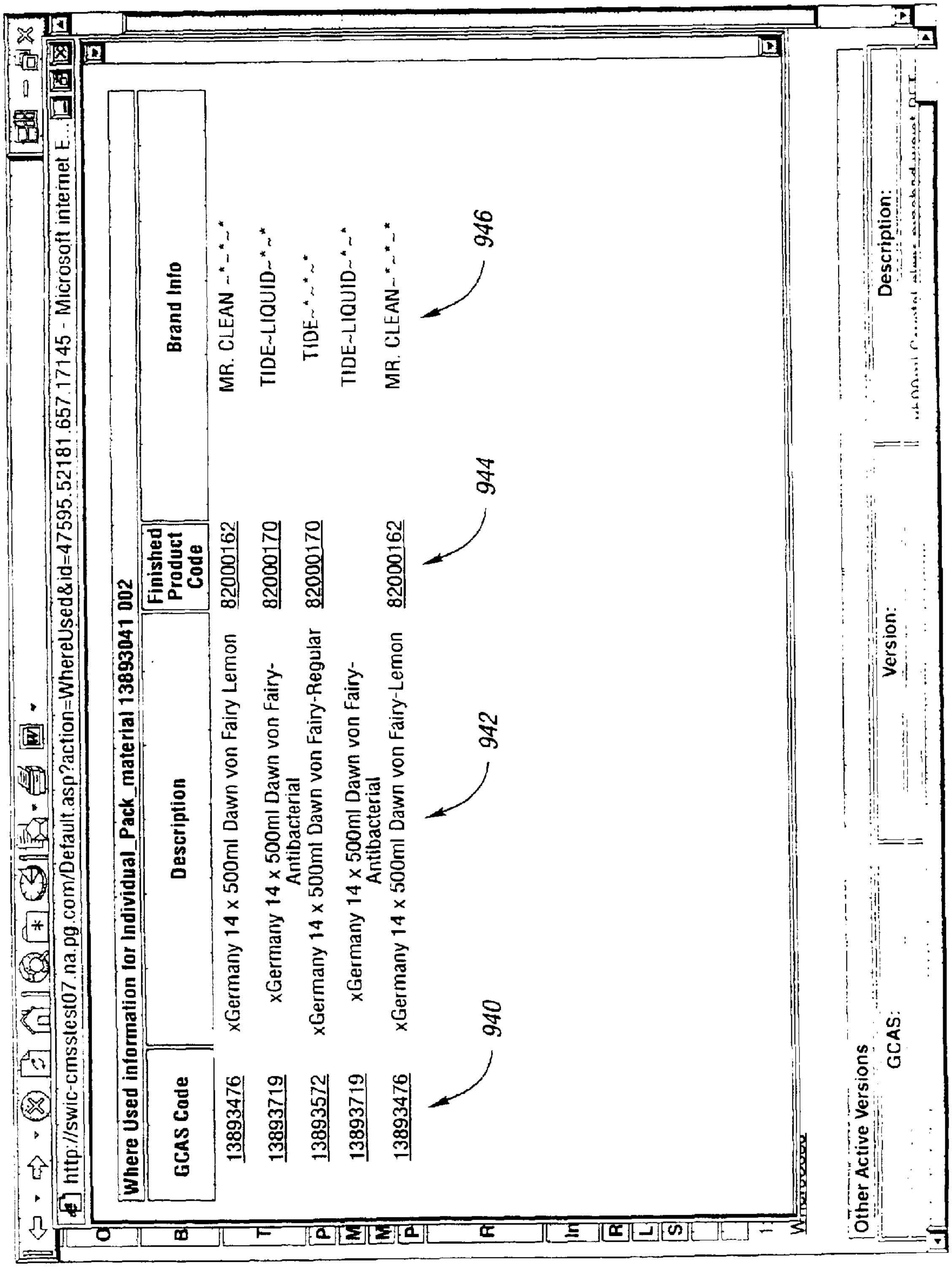

Fig. 24

Corporate Standards System - Microsoft Internet Explorer

Log Out | Help | Customer Service | Customize | GCAS Search [    ] GO

Approved Standards | Originator | Peer Reviewer | Approver | Standards Office | Maintenance Prototype database
ACTIONS: ( Copy to Revise ) ( Copy to Create New )

Individual Packing Standard

| GCAS: | 13893476 | Version: | 001 | Originator: | Business Team | Status: | Approved | Master: | 13893244 |

General | Consumer | Customer | Transport | Reference Documents | Plants | Ownership Components — 954

Performance Specs — 956

Case Count: 14

| Tracking Code | Quantity | Comments |

Consumer Unit: IC000000028 14.0

| Material GCAS Code | Description | Artwork GCAS Code | Pack Size | UOM | Quantity | UOM | Comments |
|---|---|---|---|---|---|---|---|
| 13893268 | XHot melt adhesive-synthetics cartons | | 0 | | 1.0 | | |
| 138932644 | xPatricia display case 14x500ml - Dawn lemon - Handdish Germany | | 0 | | 0.00286 | KG | |

950
958

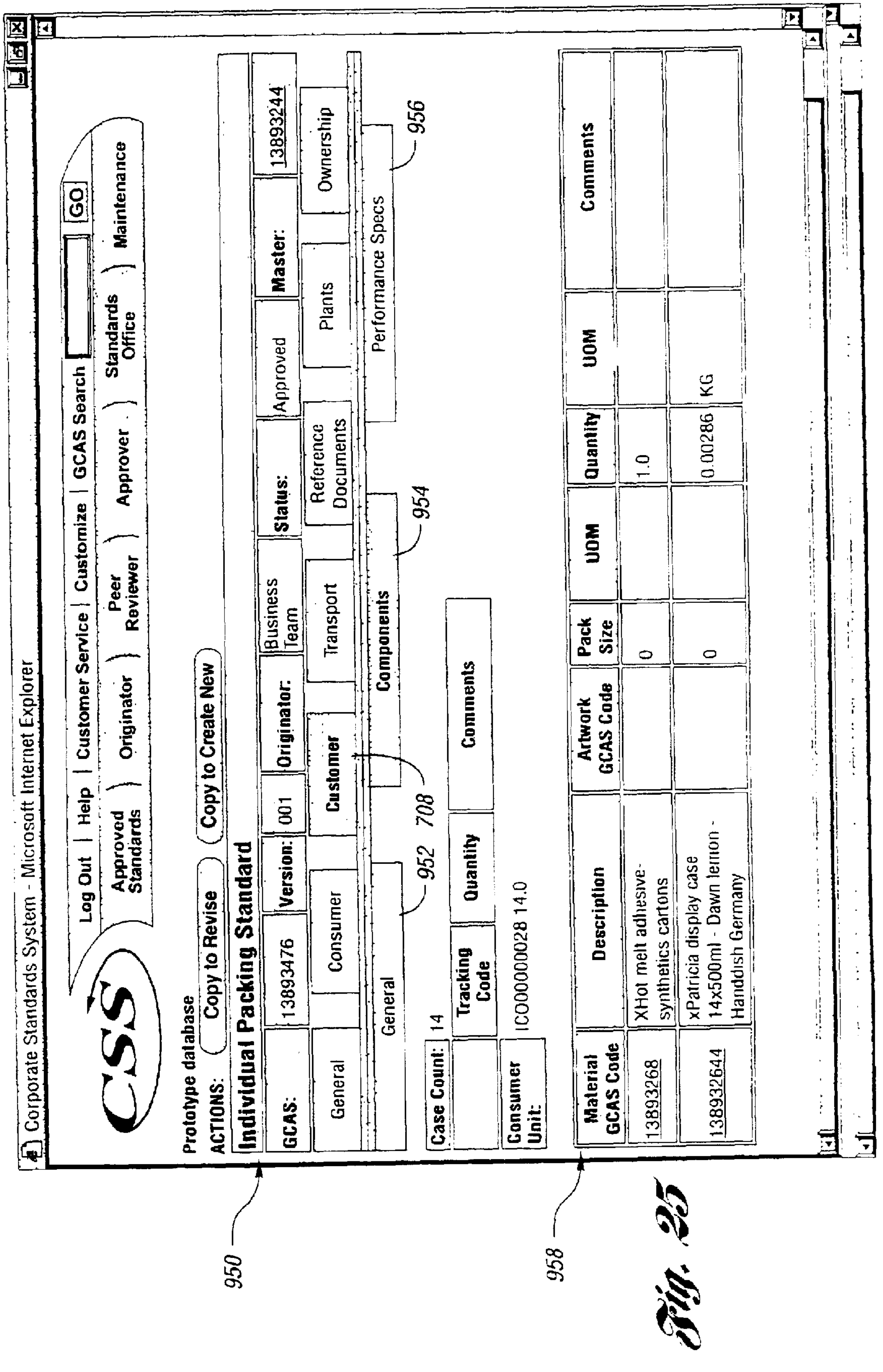

CSS
Corporate Standards System

Log Out | Help | Customer Service | Customize | GCAS Search [  ] GO

Approved Standards | Originator | Peer Reviewer | Approver | Standards Office | Maintenance

Prototype database
ACTIONS: [Copy to Revise] [Copy to Create New]

Master Packaging Standard

GCAS: 13893086    Version: 001    Originator:

| General | Performance Specs | Reference Documents | Business Team | Individuals | Status: Approved | Ownership |

Reference Documents

| GCAS | Documents | Doc Type: | Description: |
|---|---|---|---|
| 64021836 | 64021836.PDF | ILST | x PET Bottle 500 ml |
| 64024182 | 64024182.PDF | ILST | x Preform for PET Bottle 500 ml |
| 303090900 | 30309090.SLDPRT | ILST | x Bottle Blue |
| 64023979 | 64023979.PDF | ILST | x PET Bottle Neck |

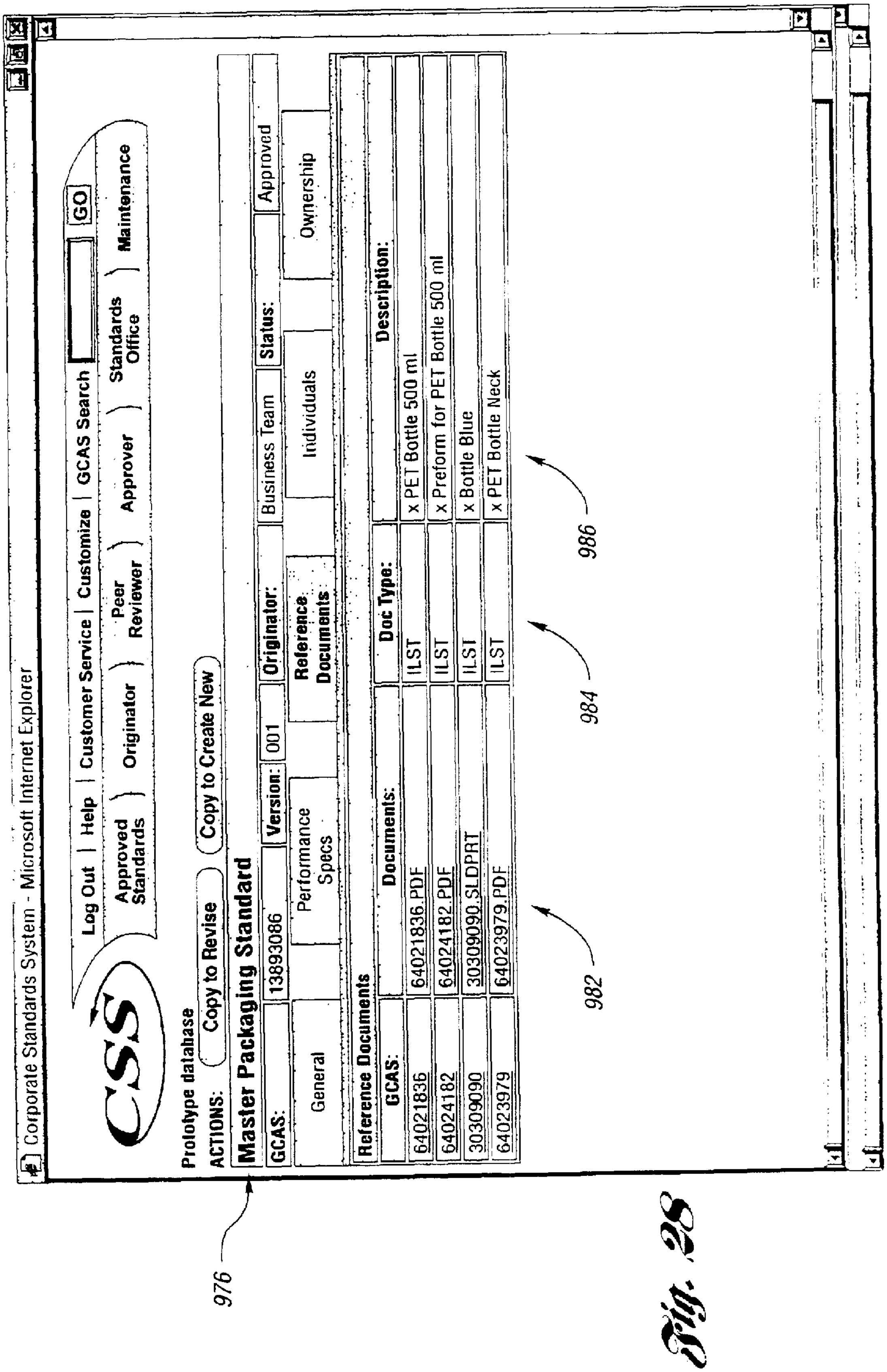

SUPPLIER INFORMATION

| | | | | | | | | |
|---|---|---|---|---|---|---|---|---|
| Trader/Distributor | Manufacturer | Manufacturer Plant Location | Manufacturer Plant Country | Manufacturer Qualification Status | Manufacturer Classification | Manufacturer Plant Line(s) | Material Trade Name | Supplier Info Sheet GCAS |
| | 3M Company | Perth, Ontario | Canada | Approved | Consistent High Quality | na | KN4339 | 60005666 |
| | 3M Company | Fairmont, Minnesota | USA | Approved | Base Situation | L2 | XPL-7226 | 60005667 |
| | | | | | | | | |
| | | | | | | | | |
| | | | | | | | | |
| | | | | | | | | |
| | | | | | | | | |

992

P&G APPROVED USE

| | | | | | | | | |
|---|---|---|---|---|---|---|---|---|
| Trader/Distributor | Manufacturer | Manufacturer Plant Location | Using Plant Location | Using GBU | Category | Brand Name | Product Name | P&RS Info |
| | 3M Company | Perth, Ontario | CG | Baby Care | | LUVS | | 387-1995-1 |
| | 3M Company | Fairmont, Minnesota | CG | Baby Care | | | | 173-1997-2 |
| | | | | | | | | |
| | | | | | | | | |
| | | | | | | | | |
| | | | | | | | | |

Fig. 30

SYSTEM AND METHOD FOR MANAGING PRODUCT DEVELOPMENT

CROSS-REFERENCE TO RELATED APPLICATION

This application claims priority to U.S. provisional patent application Ser. No. 60/256,817 filed Dec. 19, 2000 with the same title.

TECHNICAL FIELD

The present invention relates to a system and method for managing technical product requirements for product research and development.

BACKGROUND ART

Product design and development is a complex process which encompasses a wide variety of tasks that may require from several days to several years. Product development may span from identifying a need for a product to designing, testing, and obtaining approvals from governmental and/or regulatory authorities, to the manufacturing, promoting, and selling of the product. One of the most important steps in the product development process is to communicate product, package, material, and process design requirements to the internal and/or external supply chain for implementation. The use of computers to organize information and communicate with various departments within and among organizations has provided some improvement in the efficiency of the product development process. However, wide-spread implementation of integrated software-based tools has yet to be utilized, particularly within government regulated industries which require validation.

Communication of various information, such as product specifications, packaging, material and process design requirements, is often done by various groups or departments within an organization, at various times during the development, with the hope and intent that the final product elements converge flawlessly. Historically, this information has been specified in various text documents sometimes referred to as technical standards. To fully capture the technical, regulatory, safety, and various other design requirements for a given product may require between five and fifteen different documents, for example, depending upon the particular business and industry.

A number of systems have been developed to manage technical data within a supply chain environment. These systems are often used for planning, procurement, manufacture, and inventory management. While these systems may be useful in a production environment, they do not typically provide the flexibility required for use in a product development environment. Nor do they adequately integrate with product development and other enterprise systems to share information without data re-entry.

Various product design management (PDM) systems have been used to describe product elements. However, these systems tend to be useful in a narrow product field or development function, and too complex for users other than full time designers. Furthermore, these systems do not combine or manage the product, package, material, testing, regulatory, safety, and other information into a single tool. As such, these systems are unsuitable for use in a broad global enterprise having multiple diverse businesses.

Work process systems have been developed to aid with scheduling the product development process. However, these systems generally focus on project milestones, not on the actual technical content of product, package, process, and material requirements. Likewise, a number of supply chain enterprise management tools are available but are not suitable for use in the product development environment in that they are too inflexible and user unfriendly.

Existing systems which use computers to electronically manage product development information (such as technical standards) are simply filing systems for electronic versions of text documents. One problem with text-based systems is that data entered in these systems must be re-entered in other systems numerous times during the product development process and supply chain implementation. Differences in technical content and in data standards ensures such data rework will occur. Identical or related data may be entered for experimental work, consumer test clearance, plant test planning, safety assessment, material test documentation, production technical standards, supplier analysis certificates, environmental constituent tracking, and the like. Cross-checking of various elements of a completed product to ensure overall consistency and quality is therefore difficult. It is desirable to provide system checks across products, packages, materials, and test methods to ensure each is suited for a particular geographic area in terms of regulatory, safety, and legal requirements, for example.

In a large enterprise, global alignment of content and usage for text-based systems is difficult or impossible. Such alignment is important to avoid redundant data entry wherever work crosses organization or geographic boundaries. For example, different businesses and geographic regions may assign different responsibilities for the creation, approval, and use of technical standard type data. As such, content managed by one group as part of a package might be managed by another group as part of a product or a process. Alternatively, one business may complete certain tasks in product development while another business may delegate those tasks to the supply chain, for example.

SUMMARY OF THE INVENTION

An object of the present invention is to provide a system and method for managing technical data created and approved during product development for communication to a supply chain.

Another object of the present invention is to provide a system and method for capturing product, package, material, process, country clearance, and supplier approval data in structured form as output of the development process and input to the supply chain.

A further object of the present invention is to provide a system and method for product development management which support electronic review and approval of data for change control.

Another object of the present invention is to provide a product development management system and method capable of use across various businesses and geographic regions throughout a diverse enterprise to improve economies of scale in product and package design and material procurement.

Yet another object of the present invention is to accommodate various organization designs and work processes throughout an enterprise by enabling approval of data at various stages of completion and provide approvals conditioned on prior and/or subsequent approvals and data.

A further object of the present invention is to provide a system and method for managing product development which reduces redundant data entry by interfacing with various systems to communicate draft and approved data and grouping data for similar products or packages to facilitate user change management.

A still further object of the present invention is to provide a software tool that is fully validated to satisfy global regulatory requirements, for example, good manufacturing practices.

An additional object of the present invention is to provide effective security management through role-based data access and electronic signatures.

In carrying out the above objects and other objects, advantages, and features of the invention a system and method for managing product development include a relational database containing draft, approved, and archived versions of product, package, materials, process, and artwork technical data for use by product development personnel in providing a structured set of data output for use in a supply chain. In one embodiment, the relational database includes objects having data to describe design requirements of a finished product component such as a formula, material, package, artwork, and the like. Text documents may be linked to the relational data structure by reference to provide design requirements not amenable to a structured data format, such as test methods, process instructions, and the like. The system and method provide for electronic communication and electronic approval of data subsets while tracking changes and archiving previous versions for subsequent access or reference. System validation and ongoing change control provide necessary support for products in regulated industries.

In one implementation of the present invention, a system and method for managing product development include storing technical requirements data for a product including product data, material data, and packaging data in a structured relational database. Unstructured documents, such as text-based documents describing processes or testing methods and artwork for product packaging are linked to the technical requirements data within the structured relational database. The system and method then group technical requirements data into technical requirements summaries to define a finished product and link the technical requirements summaries for the finished product to facilitate user navigation among related technical requirements summaries. Changes made to the technical requirements data are stored in the relational database along with associated user security clearance information and approval information for the technical requirements data. The approved technical requirements data may then be electronically communicated for use in internal and/or external manufacturing and distribution of the finished product.

The present invention provides a number of advantages. For example, the present invention provides a flexible approach to management of product development data which may be used across diverse businesses and geographic regions using a structured data approach of master and individual level data to align content and reduce redundant data entry. Structured product development data facilitates cross-checking of various elements of a completed product to ensure overall quality. Unstructured documents linked by reference allow full integration of product and package development data. Use of the present invention across many businesses and geographic regions may provide economies of scale in product and package design and in material procurement. Electronic communication and approval of data using electronic signatures can be validated to meet global regulatory requirements and improves efficiency of the product development process.

The above advantages and other advantages, objects, and features of the present invention will be readily apparent from the following detailed description of the preferred embodiments when taken in connection with the accompanying drawings.

BRIEF DESCRIPTION OF THE DRAWINGS

FIG. 11 illustrates representative technical information for a consumer unit of a master packing standard according to one embodiment of the present invention;

FIG. 13 illustrates representative general data associated with an individual packing standard according to one embodiment of the present invention;

FIG. 14 illustrates representative consumer unit data associated with an individual packing standard according to one embodiment of the present invention;

FIG. 17 illustrates performance specification data for an individual packing material specification according to one embodiment of the present invention;

FIG. 20 illustrates basis or rationale data associated with the performance specifications for an individual packaging material standard according to one embodiment of the present invention;

FIG. 24 illustrates search results to determine locations using an individual packaging material according to one embodiment of the present invention;

FIG. 25 illustrates customer level data of an individual packing standard according to one embodiment of the present invention;

FIG. 28 illustrates unstructured drawing documents linked to a master packaging material specification according to one embodiment of the present invention;

FIG. 30 illustrates an approved supplier list generated for a product or packaging specification according to one embodiment of the present invention;

DETAILED DESCRIPTION OF THE PREFERRED EMBODIMENT(S)

Figure 1:
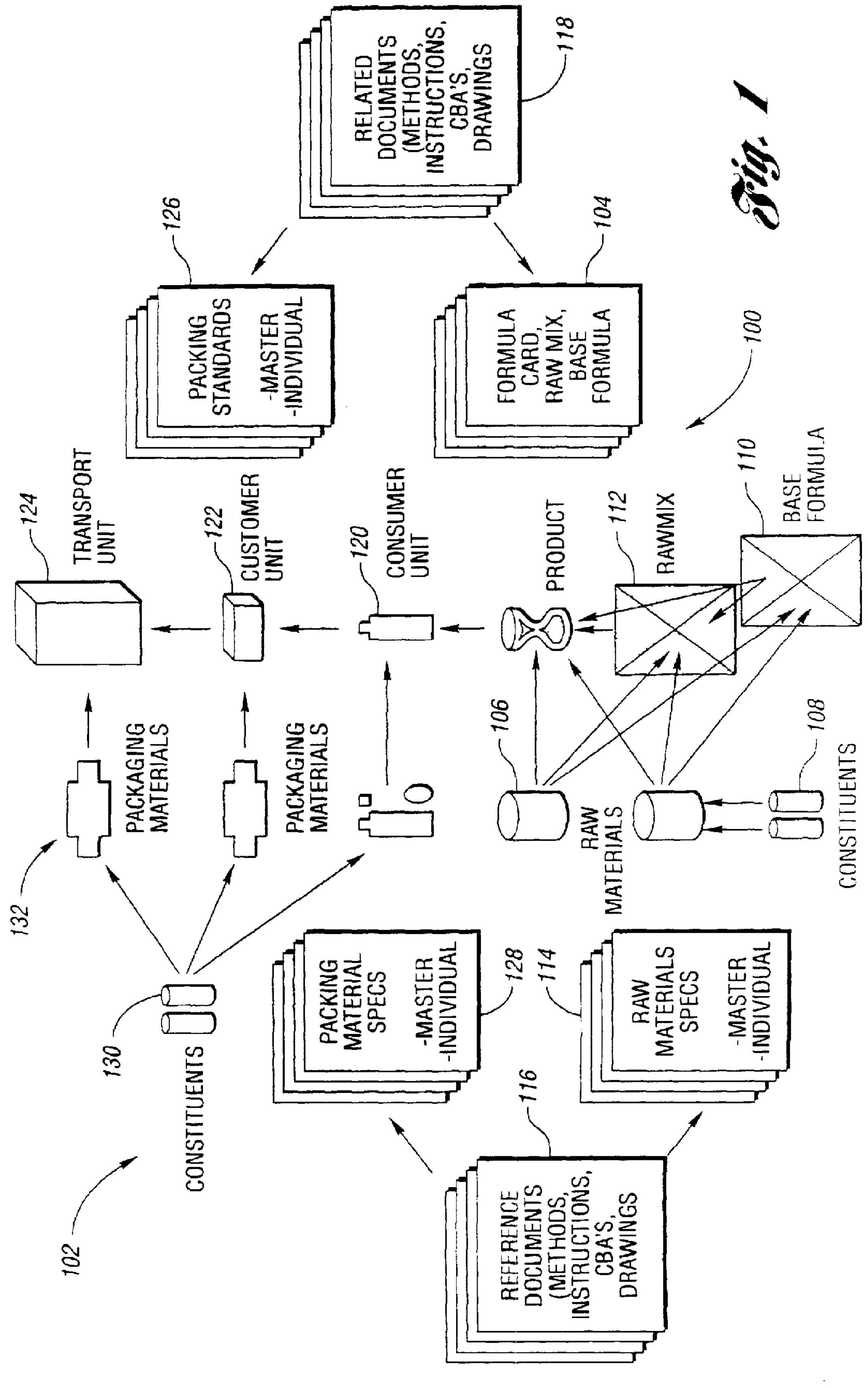
FIG. 1 is a block diagram providing an overview of technical requirements data used in a system or method for managing product development according to the present invention.

FIG. 1 provides an overview of various technical standards used in a system or method for managing product development according to one embodiment of the present invention. As will be appreciated by those of ordinary skill in the art, the present invention is applicable to managing information associated with development of various types of products. In the preferred embodiment, the invention is used in managing development of consumer goods which may include various government-related products. Of course, the invention is also applicable to various other types of products, such as appliances or other devices. The present invention integrates documents and information associated with the products, represented generally by reference numeral 100, with documents and information associated with the packaging, represented generally by reference numeral 102. Product-related data and documents 100 may include various technical requirements which are summarized by a formula card 104 associated with the particular product. Formula card 104 may include information relative to the raw materials 106 and related constituents 108 used in the base formula 110 and/or raw mixture 112 specified by formula card 104.

One of ordinary skill in the art will appreciate that some products are specified more by a product design than a formula. One example of a product using a classical formula would be a shampoo. A product which really has more of a product design would be a water filter, or even a diaper, for example. As such, the base formula, formula card, and similar objects may also be used to describe product designs for applicable products.

Raw materials specifications 114 preferably include master-level and individual-level specifications which provide data relative to raw materials 106 and constituents 108. Reference documents 116 provide additional data relative to process methods, testing methods, instructions, current best approaches (CBAs), drawings, and the like associated with the product 100 and packaging 102. Likewise, technical requirements summaries for the product formula card 104 include links or references to related documents 118. As such, technical requirements data for a finished product, represented by reference numeral 100, include product raw material specifications 114 and associated reference documents 116 which may include structured data, unstructured documents linked by reference, and unstructured documents with associated structured attributes, in addition to a formula card 104 and related documents 118.

Technical requirements data for the finished product associated with packaging as represented by reference numeral 102 are preferably separated or divided into a consumer unit or level 120, a customer unit or level 122, and a transport unit or level 124. These units or levels are summarized in packing standards 126 which may include various master-level and individual-level standards. Depending upon the particular application, each master may have one or more than one individual standard associated with it. In addition, each master and individual standard can have one or more than one version which may also function as an audit trail for change control. Packing standards 126 may also be associated with related unstructured packaging documents 118.

Technical requirements data associated with the packaging materials is summarized in package material specifications 128 which may include master and individual level specifications as described with reference to the raw material specifications 114 and packing standards 126. Package material specifications 128 may be linked to associated packaging material reference documents 116. Package material specifications 128 include technical requirements data relative to constituents 130 used in packaging materials 132 associated with the consumer unit 120, customer unit 122, and transport unit 124. As explained in greater detail below, consumer unit 120 represents the product packaging seen by the end-user or consumer. Customer unit packaging corresponds to the packaging used to group a number of consumer units for delivery to a retailer, such as a case, for example. Transport unit packaging materials correspond to those materials used in grouping customer units from the manufacturer to a wholesaler, for example.

As such, the packaging data 102 is summarized in the package material specifications 128 and related reference documents 116 in addition to the packing standards 126 and related reference documents 118.

Figure 2:
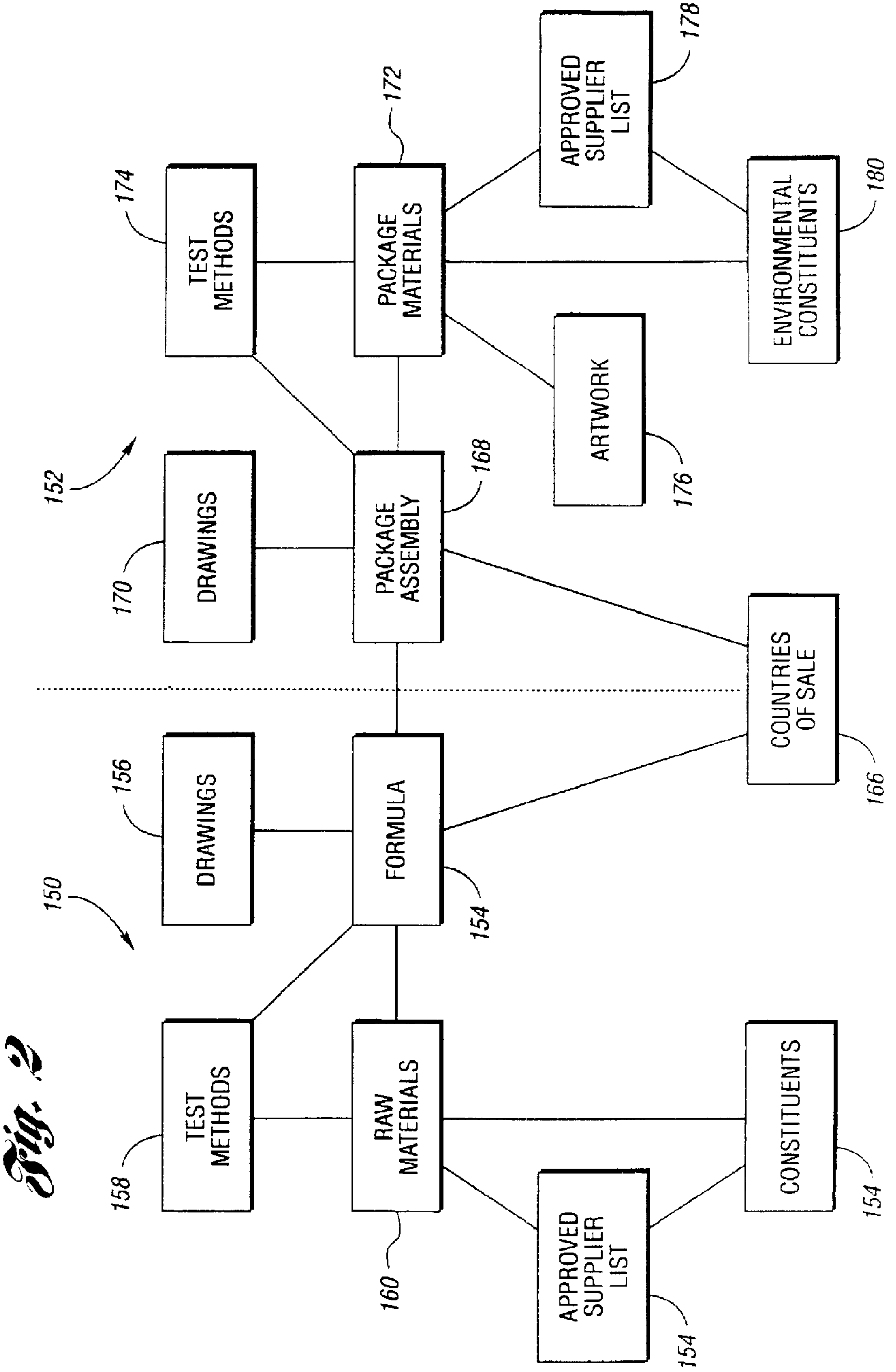
FIG. 2 is a block diagram illustrating relationships among structured and unstructured documents in a system or method for managing product development according to the present invention.

Referring now to FIG. 2, an overview of the structured data relationships for a system or method for managing product development according to the present invention is shown. Product-related data-structured relationships are represented generally by reference numeral 150. Packaging-related data-structured relationships are represented generally by reference numeral 152. Each formula card 154 preferably has associated unstructured documents such as drawings 156 which may be linked to formula card 154 by reference to data-structured attributes. In one embodiment, formula card 154 includes references to unstructured documents based on a path and file name for the documents.

Formula 154 also includes related test methods used to test associated raw materials 160 and/or the finished product represented by formula card 154. Raw materials 160 are preferably obtained from suppliers which have been previously approved and stored in an associated approved supplier list 162. Likewise, constituents 164 associated with one or more raw materials 160 may be obtained from a supplier indicated by the approved supplier list 162.

Depending upon the particular application, formula card 154 may be approved for use or sale in one or more countries as represented by the associated countries of sale list 166. Formula card 154 may have one or more associated package assemblies 168 as specified in drawings 170. Package assemblies 168 specify related package materials 172 which are linked to related structured and unstructured data. In this embodiment, unstructured documents may be used to specify test methods 174 and artwork 176, for example. Package material 172 may include links to various structured data such as environmental constituents 180 contained within the package materials 172 along with the approved suppliers 178 associated with the package materials 172 and/or environmental constituents 180.

Figure 3:
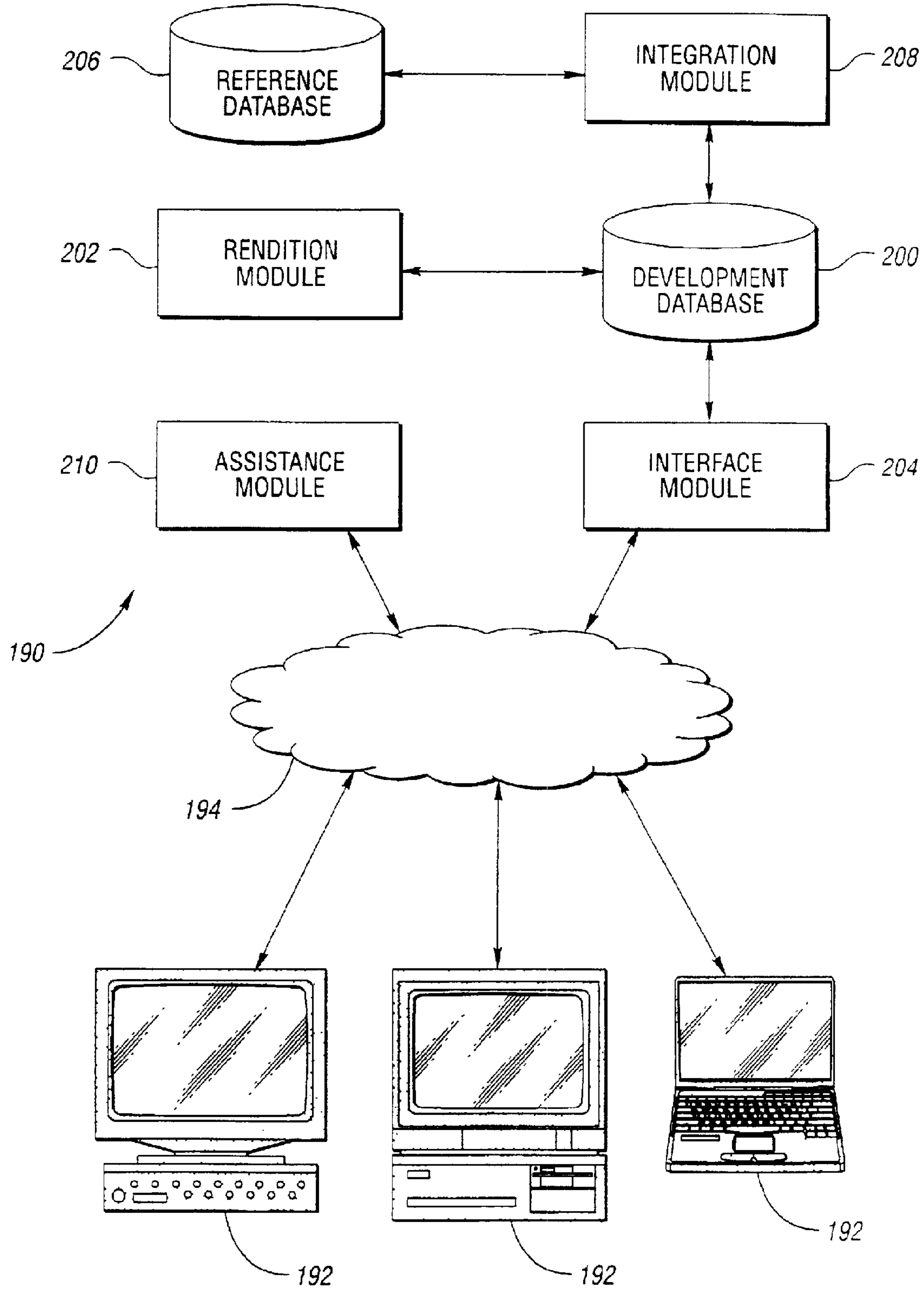
FIG. 3 is a block diagram illustrating a system for managing product development according to one embodiment of the present invention.

Referring now to FIG. 3, a block diagram illustrating one embodiment for a system for managing product development according to the present invention is shown. System 190 is preferably accessible by a plurality of users 192 via one or more electronic communication media represented generally by reference numeral 194. As will be recognized by one of ordinary skill in the art, communication media 194 may be any one or more wired or wireless networks used to electronically exchange information including various private and public local/wide area networks such as the Internet, private networks, or telecommunication systems, for example. Preferably, access to system 190 by users 192 is limited to subsets of the technical requirements data based on a user identification and password. The system security is preferably based on user roles and business needs and may vary by location and/or project. Unique identification of a particular user using an electronic signature provides the ability to electronically create, review, approve, and distribute technical standards as described in greater detail in U.S. application Ser. No. 09/808,001 filed Mar. 14, 2001, entitled "Technical Standard Review And Approval", commonly owned by the assignee of the present invention. System 190 preferably contains draft, approved, and archived versions of the technical standards. System validation and ongoing change control is preferably provided so that the system may be used to develop products which may be regulated by various governments or authorities.

System 190 includes a product development database 200 for storing technical standards and related documentation during various stages of product development and manufacture. Preferably, development database 200 is a relational database which includes structured data in addition to references to unstructured documents. System 190 preferably includes a rendition module 202 in communication with development database 200 for rendering an approved technical standard unchangeable. Rendition module 202 may be implemented as a server capable of converting approved draft technical standards into a platform independent format such as the portable document format (PDF), for example. System 190 may also include an interface module 204 in communication with development database 200. Interface module 204 may be used to electronically exchange information used during product development. For example, interface module 204 may be used to circulate draft technical standards to associated reviewers to obtain electronic approvals. In one embodiment, interface module 204 is implemented as a collaborative web interface server.

System 190 preferably includes a reference database 206 for storing approved technical standards. An integration module 208 in communication with reference database 206 and development database 200 copies approved technical documents from development database 200 to reference database 206. System 190 may also include an assistance module 210 accessible via communication medium 194 to provide users 192 with automated help and on-line tutorials, for example.

As will be recognized by one of ordinary skill in the art, system 190 may have various configurations and implementations other than those shown and described. For example, reference database 206 and development database 200 may be combined into a single relational database. Either or both of reference databases 206 and development database 200 may also be distributed among one or more servers and/or locations. Likewise, some or all of rendition module 202, interface module 204, and assistance module 210 may execute on the same computer, closely integrated computers, computers connected through a local area network, or widely dispersed computers. Similarly, modules may be distributed across multiple computers which may be co-located or geographically diverse.

Figure 4A:
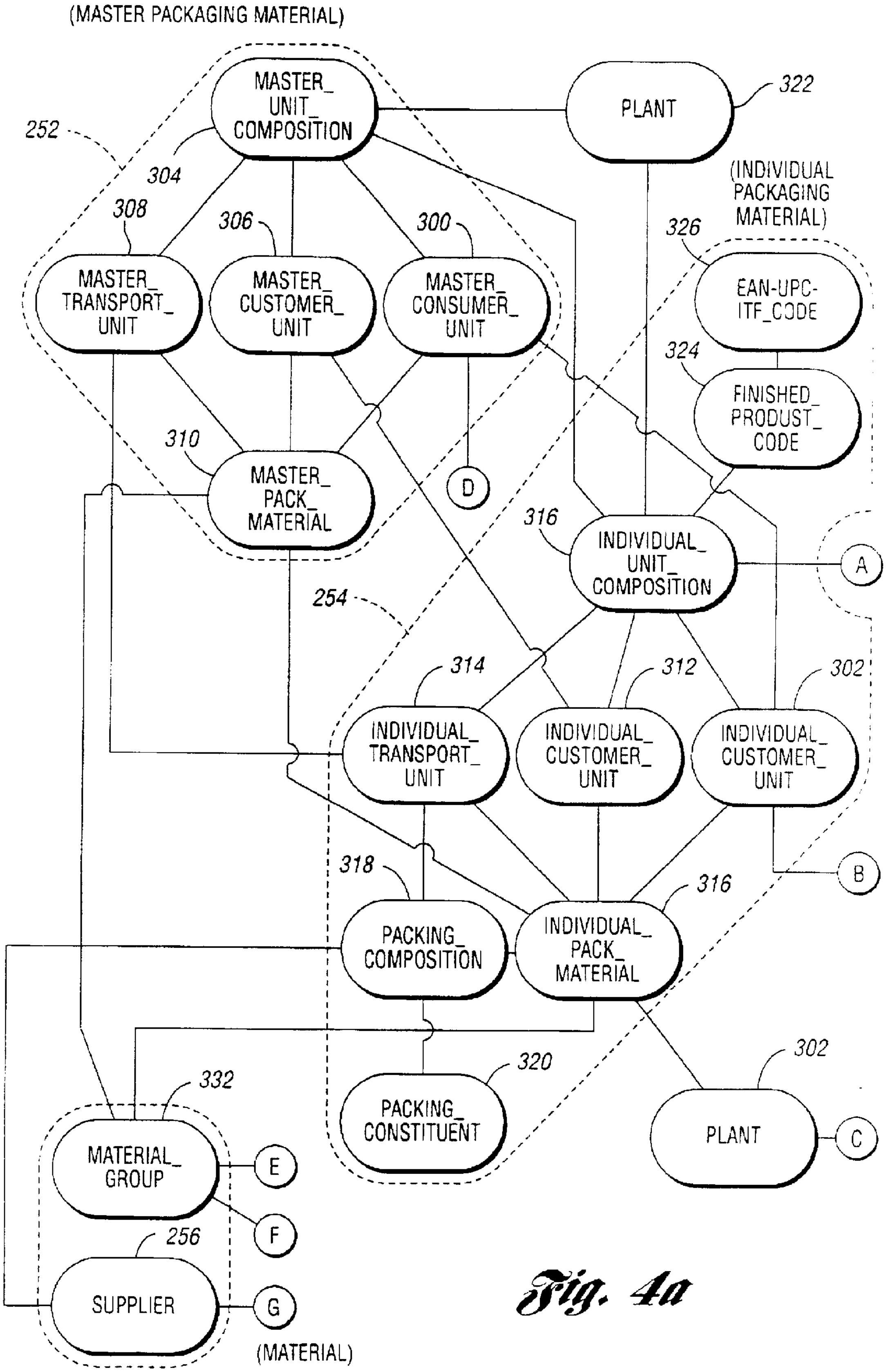
FIG. 4 is a block diagram providing an overview of relationships among various data modules for a system or method of managing product development according to one embodiment of the present invention.
Figure 4B:
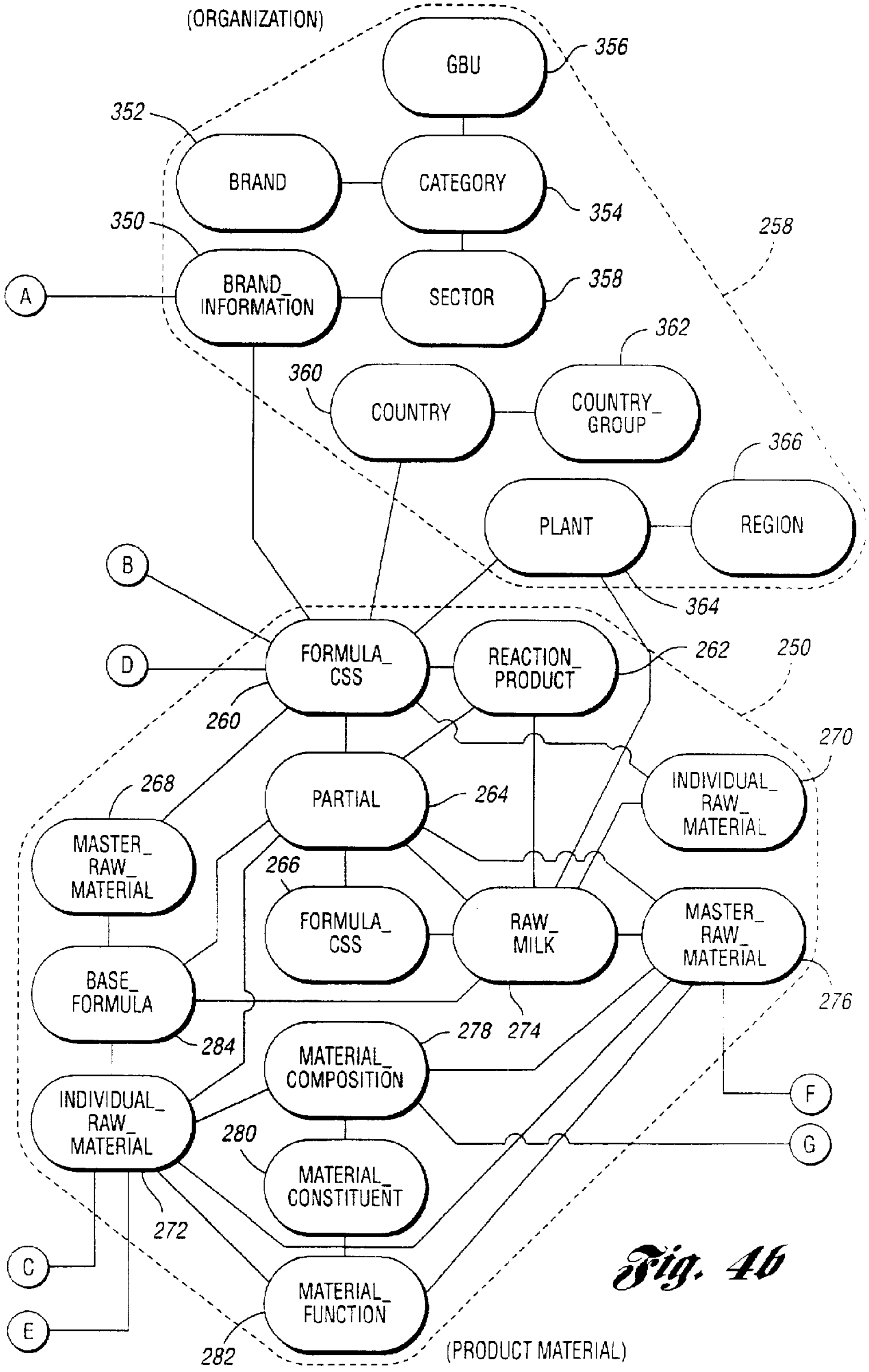

FIG. 4 provides a more detailed representation of relationships among various technical requirements data used in managing product development according to one embodiment of the present invention. As illustrated in FIG. 4, the technical requirements data may be grouped according to product material data 250, master packaging material data 252, individual packaging material data 254, material data 256, and organization data 258. Unless otherwise specified, each data subgroup is related to an associated data subgroup by a many-to-many relationship among structured data fields.

Product material data 250 includes a formula card 160 which summarizes the product data for a particular product. Formula 260 may have related reaction product information 262 and partial formulations 264. Formula 260 is preferably linked or associated with master and individual raw material specification data 268 and 270. Because this embodiment does not include an individual and master formula, links from formula 260 are provided to the individual or the master material.

Partial formulation information 264 may be associated with base formula information 270 which specifies one or more master raw materials 268 and/or individual raw materials 272. Base formula 270 may also specify raw material mixtures 274 which have associated master raw materials 276 and individual raw materials 270.

Master raw material data 276 and individual raw material data 272 are linked to material composition data 278 which may include one or more material constituents 280 and associated material functions 282.

Product material data 250 is preferably linked to master packaging material 252 via master formula 260 and master consumer unit 300. Product material data 250 may also be linked to individual packaging material data 254 via master formula 260 and individual consumer unit data 302. In one embodiment, master packaging material information 252 is summarized based on a master unit composition 304 which is broken down into master consumer unit 300, master customer unit 306, and master transport unit 308. The master consumer, customer, and transport units are linked to master packaging material information 310 in addition to corresponding individual consumer unit 302, customer unit 312, and transport unit 314, respectively, within individual packaging material data group 254.

Individual packaging material 254 may be summarized by an individual unit composition represented by block 316. The individual unit composition includes associated consumer unit 302, customer unit 312, and transport unit 314 linked to individual packaging material data 316 which specifies the packing composition 318 and associated packing constituents 320. Individual unit composition 316 may also be associated with one or more approved or activated manufacturing plants 322. Likewise, individual unit composition 316 is preferably associated with an internal finished product code 324 and one or more external product codes 326. Preferably, external product codes 326 have a many-to-one relationship with internal finished product codes 324.

Material product development information 256 may include supplier information 330 associated with packaging material 254 via packing composition data 318 and product material data 250 via material composition data 278. Material group information 332 is preferably related to master packaging material data 252 via master packaging material information 310. In addition, material group 332 is linked to individual packaging material data 254 via individual packing material data 316 and to product material data 250 via individual and master raw material specifications 272 and 276, respectively.

Organization data 258 includes brand information linked by a many-to-one relationship to a product brand 352 which may belong to a brand category 354 associated with a particular business unit 356 and sector 358. In the illustrated embodiment, each sector 358 may include a number of categories 354, i.e. the category information is linked by a many-to-one relationship to the sector information 358.

Organization data 258 may also include country 360 or country group 362 information in addition to manufacturing plant and region information 364 and 366, respectively. Preferably, organizational information 258 is linked to individual packaging material data 254 via brand information 350 and individual unit composition 316. Organization data 258 may be linked to product material data 250 via brand information 350, country information 360, plant information 364 and master formula card 260. In addition, plant 364 may be associated with product raw material mixtures 274.

Thus, FIG. 4 illustrates one embodiment for managing the technical requirements data of a product with product data, material data, and packaging data stored in a structured relational database. The technical requirements data is grouped into various technical requirement summaries such as the product material data 250 and the master and individual packaging material data 252 and 254, for example. The illustrated links or relationships facilitate using navigation among related technical requirement summaries. The structured data relationships facilitate the recording of changes made to various technical requirements data and allow tracking of associated user identification information while reducing redundant data entry at various stages during product development.

Figure 5:
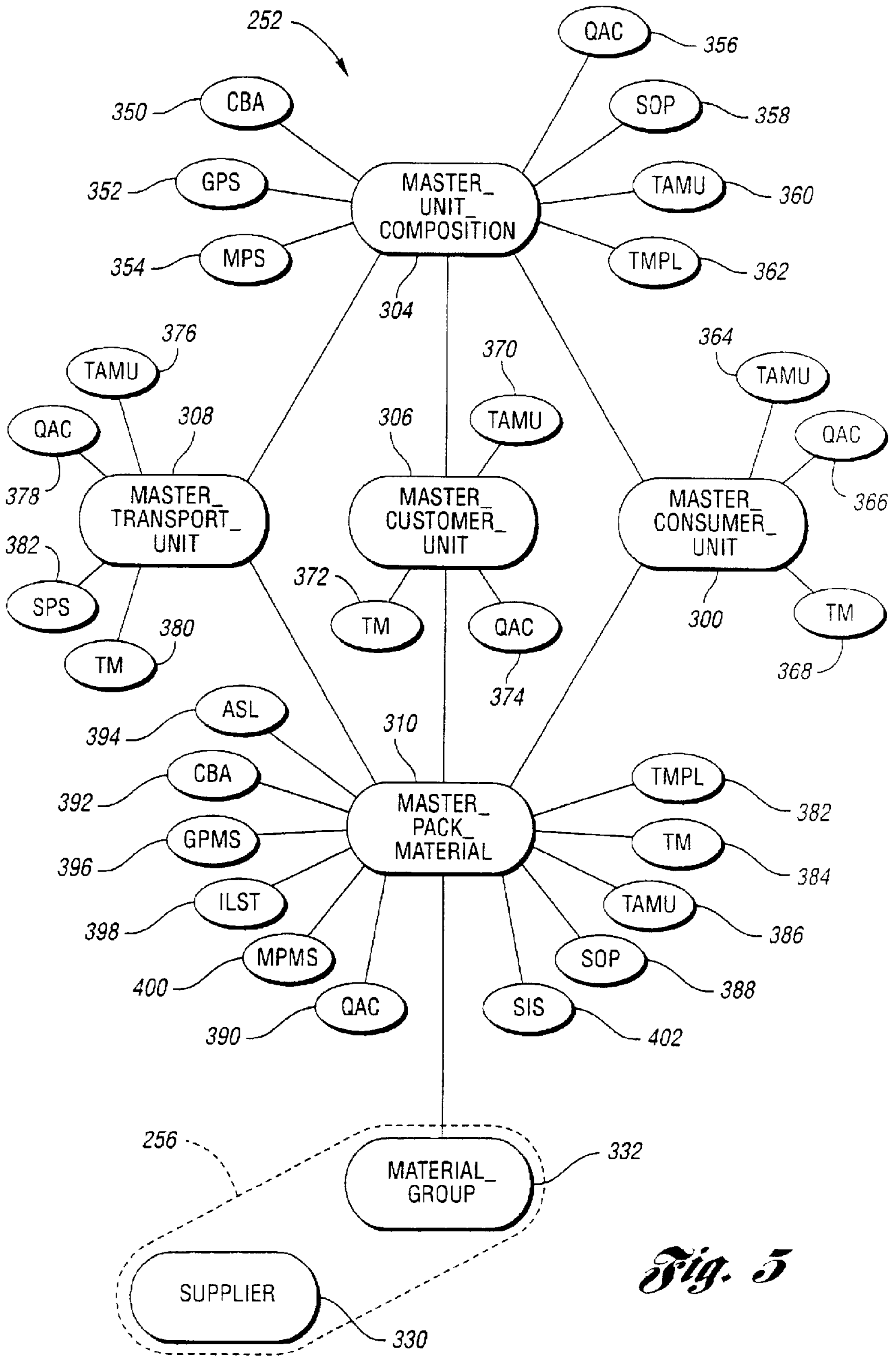
FIG. 5 is a block diagram providing a more detailed representation of a schema for a master packaging material and material structure according to one embodiment of the present invention.

FIG. 5 provides a more detailed representation of the master packaging material data 252 (FIG. 4). Master unit composition data 304 summarizes the consumer unit data 300, customer unit data 306, and transport unit data 308 and provides commonality across a set of individual unit compositions. Master unit composition 304 includes associated current best approach (CBA) technical standard which is preferably an unstructured document linked by reference. CBA 350 describes the recommended or preferred approach associated with the packaging material composition for a particular product. Master unit composition 304 also includes an associated general packing standard (GPS) technical standard 352, master packing standard (MPS) technical standard 354, quality acceptance criteria (QAC) technical standard 356, standard operating procedure (SOP) technical standard 358, target-acceptable-marginal-unacceptable (TAMU) technical standard 360, and template (TMPL) 362.

Master consumer unit 300 includes information which describes the materials that make up the end-user or consumer unit (e.g. bottle, cap, product) and provides commonality across a set of individual consumer units. Master consumer unit 300 preferably includes associated TAMU and QAC technical standards 364 and 366, respectively. In addition, master consumer unit 300 preferably includes an associated test method (TM) technical standard 368. In one embodiment, TM technical standard 368 is an unstructured document which is linked by reference to a path and file name for the document.

Master customer unit 306 describes the materials that make up the customer unit (e.g. case, etc.) and provides commonality across a set of individual customer units. Master customer unit 306 preferably includes associated or linked TAMU technical standard 370, TM technical standard 372, and QAC technical standard 374.

Master transport unit 308 describes the materials that make up the transport unit, such as the pallet, polywrap, etc. As the master, transport unit 308 provides commonality across a set of individual transport units. As illustrated, master transport unit 308 includes associated TAMU, QAC, and TM technical standards 376, 378, and 380, respectively. In addition, a stacking patterns (SPS) technical standard 382 specifies the requirements for forming a transport unit from a group of customer units.

Master packaging material data 310 describes the materials that can go into a unit composition and provides commonality across a set of individual packaging materials. Master packaging material data 310 may include an associated template 382, TM standard 384, TAMU standard 386, SOP standard 388, QAC standard 390, and CBA standard 392. In addition, master packaging material 310 preferably includes an associated approved supplier list (ASL) technical standard 394 and a general packaging material specification (GPMS) standard 396. In addition, an associated illustrations (ILST) technical standard 398, master packaging material specification (MPMS) technical standard 400, and supplier information sheet (SIS) technical standard 402 may be linked to master packaging material 310.

A material group 332 is preferably associated with master packaging material data 310 to describe the classification of packaging and raw materials for the products. Supplier data 330 describes the trader/distributor for the various materials used for products and packaging as described above with reference to FIG. 4.

Figure 6:
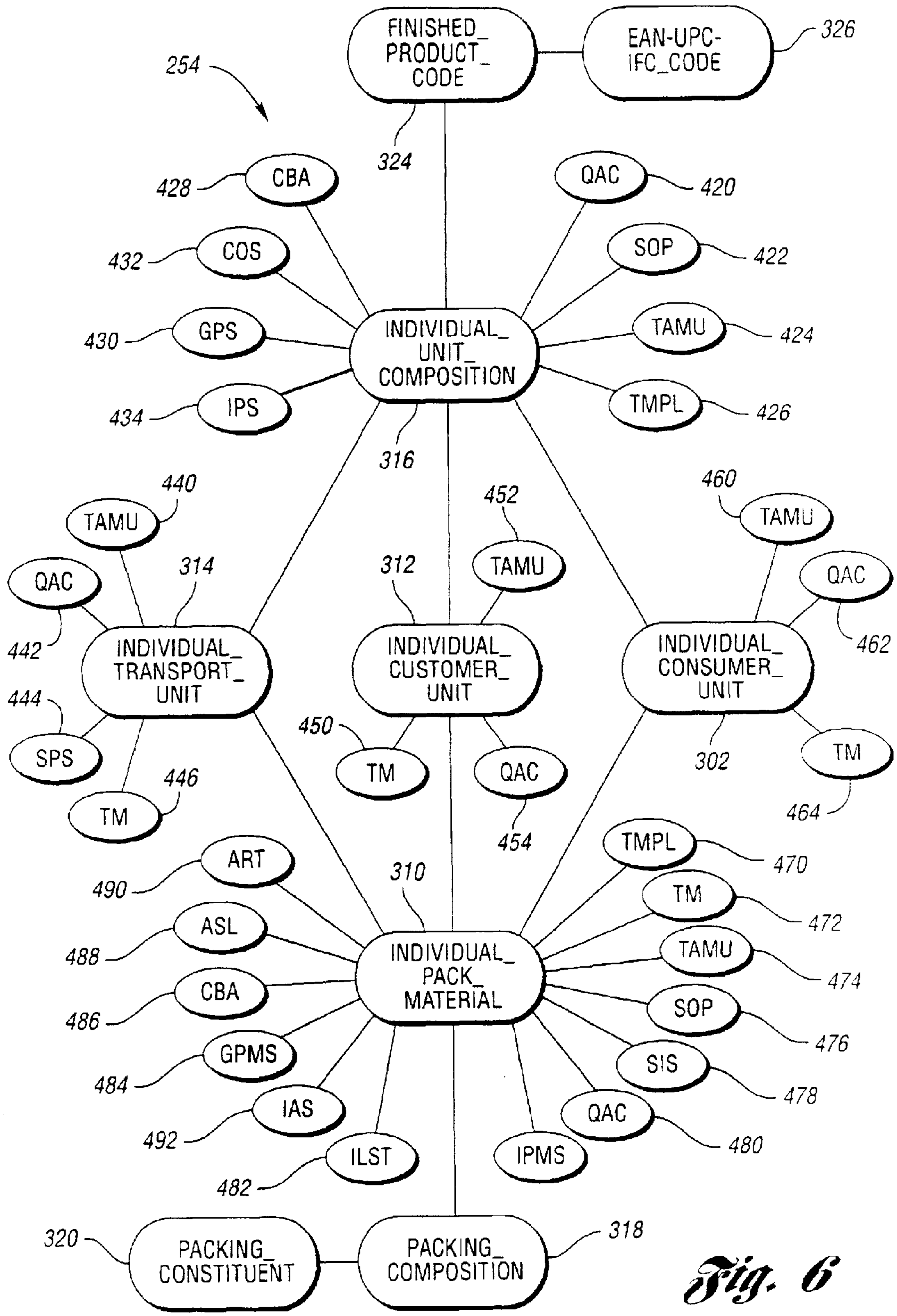
FIG. 6 is a block diagram providing a more detailed representation of a schema for individual packaging material according to one embodiment of the present invention.

FIG. 6 provides a more detailed representation of the individual packaging material schema according to one embodiment of the present invention. The individual level of consumer, customer, and sometimes even transport units, are used to identify a particular execution for a particular market, for example, to identify a particular product variant for a particular country, with specific artwork associated with that country. Individual packaging material data 254 includes individual unit composition data 316 which combines individual consumer unit data 302, individual customer unit data 312, and individual transport unit data 314. Individual consumer unit data 302 describes the materials that make up a particular customer unit such as a bottle, cap, and product, for example. Individual customer unit 312 describes a case, etc. that make up a customer unit. Individual transport unit 314 describes a pallet, polywrap, etc. that make up the transport unit. The consumer unit 302, customer unit 312, and transport unit data 314 are linked to individual packaging material 316 which describes the materials that can go into a particular unit composition. Packing composition 318 tracks the individual constituents 320 that make up an individual packaging material.

Individual unit composition data 316 is linked to finished product code 324 which describes the saleable product from the packaging point of view. The finished product code data 324 has a one-to-many relationship with the ean/upc/itf code 326 which contains the code for a stock-keeping unit.

Individual unit composition 316 includes a number of related standards including QAC 420, SOP 422, TAMU 424, TMPL 426, CBA 428, and GPS 430 standards. In addition, individual unit composition data 316 preferably includes an associated countries of sale (COS) technical standard 432 and an individual packing standard (IPS) technical standard 434.

Individual transport unit data 314 preferably includes a number of related standards similar to those described above. In particular, individual transport unit 314 preferably includes a TAMU 440, QAC 442, SPS 444, and TM 446 standard. Likewise, individual customer unit data 312 includes a TM 450, TAMU 452, and QAC 454 standard. Similarly, individual consumer unit 302 may include associated TAMU 460, QAC 462, and TM 464 technical standards.

As also illustrated in FIG. 6, individual packaging material data 316 preferably includes various related technical standards. In particular, a TMPL 470, TM 472, TAMU 474, SOP 476, SIS 478, and QAC 480 standard. In addition, individual packaging material 316 preferably includes an associated ILST 482, GPMS 484, CBA 486, and ASL 488 standard. An artwork (ART) technical standard 490, incoming acceptance standards (IAS) technical standard 492, and an individual packaging material specification (IPMS) technical standard are also preferably associated with individual packaging material standard 316.

Figure 7:
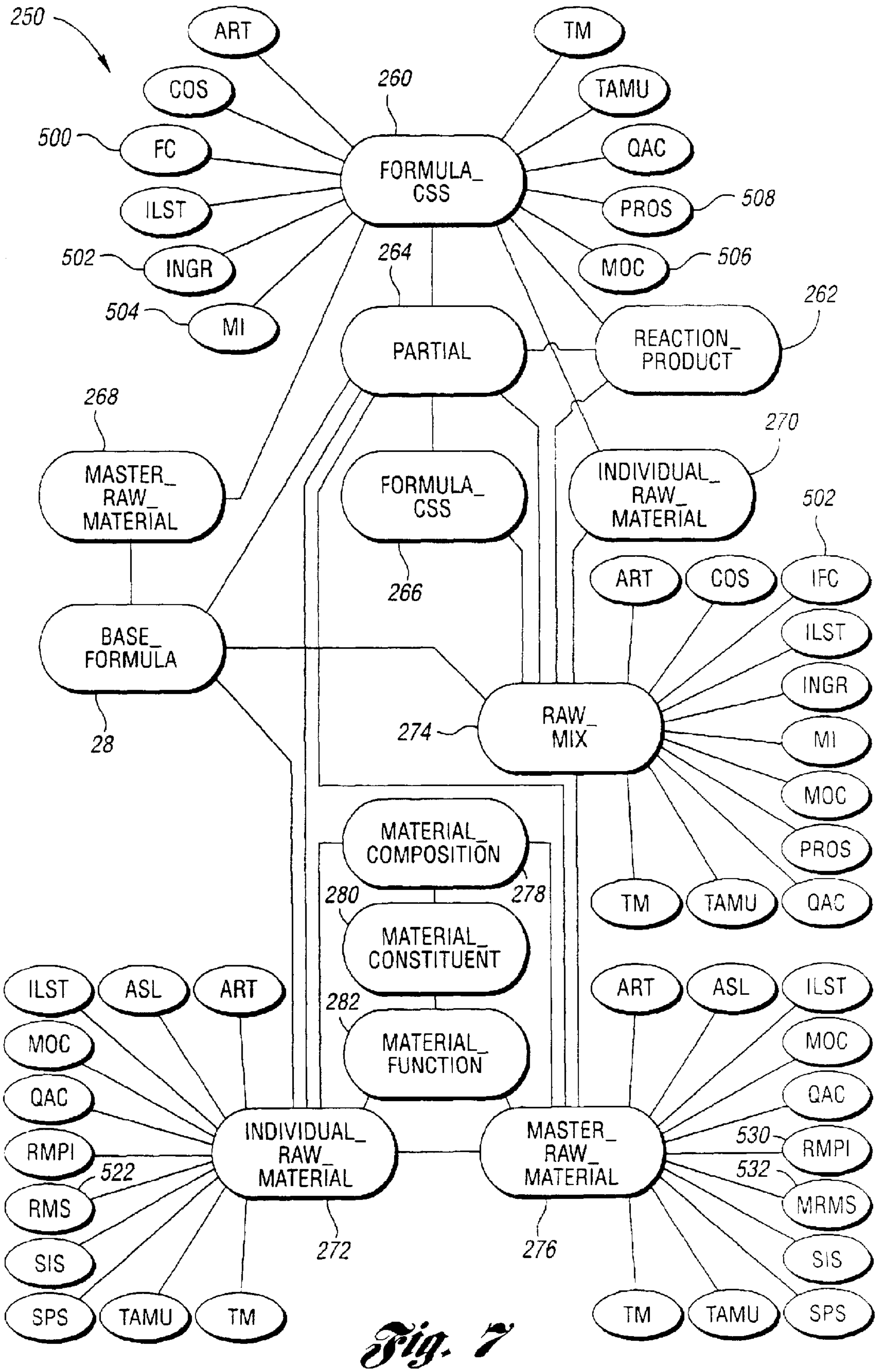
FIG. 7 is a block diagram providing a more detailed representation of a schema for a product material according to one embodiment of the present invention.

FIG. 7 provides a more detailed representation of a product material schema according to one embodiment of the present invention. Product material schema 250 may include a formula standard 260 which describes a formulation that may be used in a saleable product. Formula 260 is linked to reaction product data 262 which described a byproduct resulting from a formulation or from one phase of a formulation as represented by blocks 264 and 266. Base formula data 270, linked to master raw material data 268 and individual raw material data 272, describes a common subset of materials that comprise many formulations. The base formula data 27 is also linked to raw mix data 274 which describes the use of a formulation as a component of another formulation. Raw mix data 274 may be a formulation that is used only in another formulation or, alternatively, may be used alone in a saleable product. Formula information 260 is also preferably linked to master raw material 268 and individual raw material information 270 which describes the materials that can go into a particular formulation. Partial formulation information 264 may also include associated individual raw material information 272 and master raw material information 276.

Individual raw material 272 associated with partial formulation information 254 may also be linked to master raw material information 276 via material composition information 278 which collects information related to the individual constituents 280 that make up a particular raw material. Individual and master raw material data 272 and 276 may also be linked by material function data 282 which describes the function of a specific raw material.

With continuing reference to FIG. 7, formula information 260 is linked to a number of related technical standards as illustrated and as described above with reference to FIGS. 4–6. In addition, formula 260 preferably includes a formula card (FC) technical standard 500, and ingredient disclosures (INGR) technical standard 502, a making instructions (MI) technical standard 504, a material of construction (MOC) technical standard 506, and a process standards (PROC) technical standard 508. Likewise, raw mix data 274 preferably includes numerous technical standards as illustrated in FIG. 7 and previously described. In addition, raw mix data 274 may include an in-process formula card (IFC) technical standard 520.

Similar standards are associated with the individual and raw material data 272 and 276, respectively. For example, master raw material data 276 includes associated technical standards or specifications for artwork, approved suppliers, illustrations, materials of construction, quality acceptance criteria, supplier information sheets, stacking patterns, target-acceptable-margin-unacceptable standards, and test method standards as illustrated in FIG. 7. In addition, master raw material data 276 preferably includes a raw material plant instructions (RMPI) technical standard 530 and a master raw material specification (MRMS) technical standard 532. An individual raw material specification (RMS) technical standard 522 is associated with individual raw material data 272.

Figure 8:
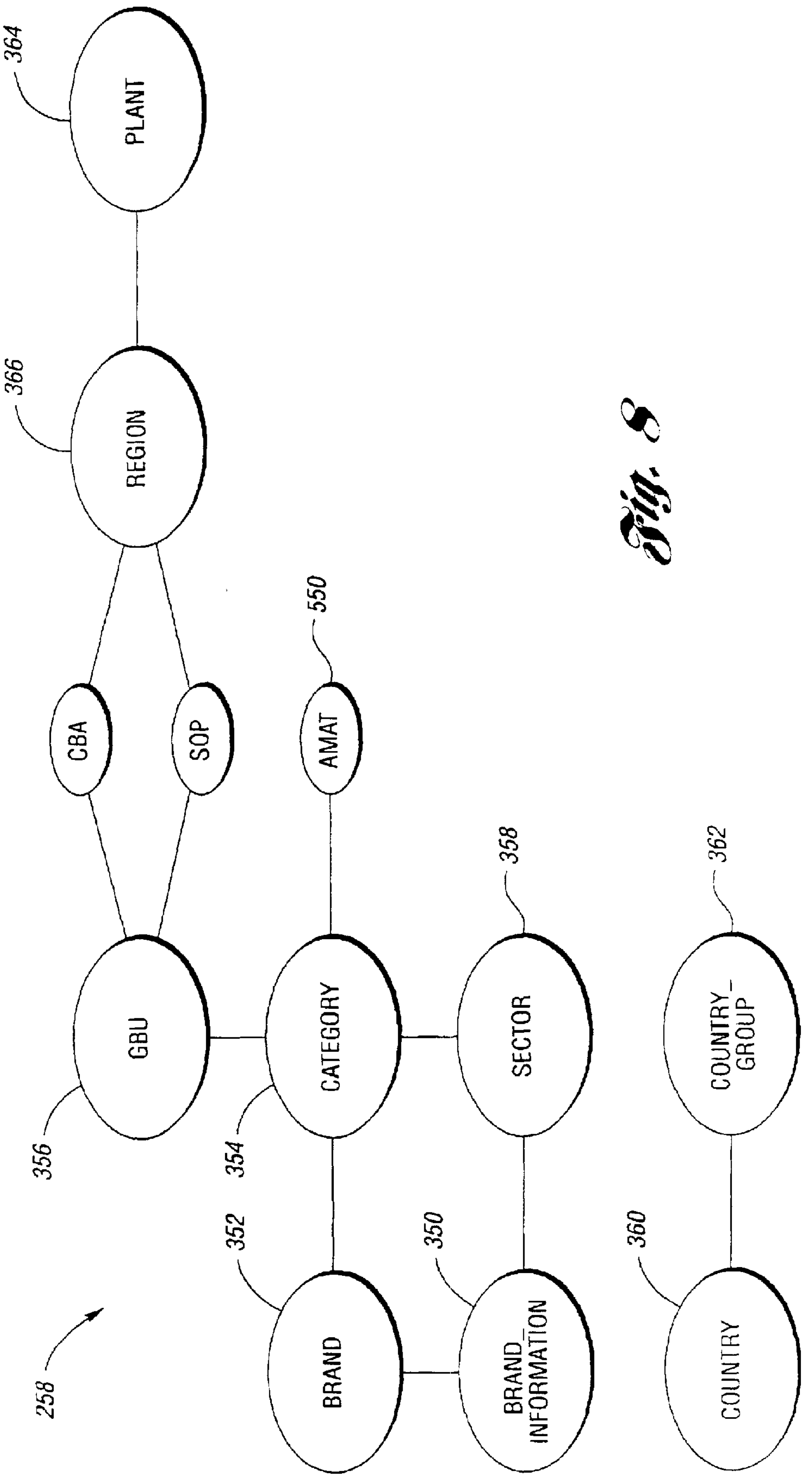
FIG. 8 is a block diagram illustrating a schema for an organizational structure used in a system or method for managing product development according to one embodiment of the present invention.

FIG. 8 provides a more detailed representation of the business organization related schema according to one embodiment of the present invention. Business-related or organizational schema 258 includes brand information 350 which describes a formulation from the product point of view. Brand information 350 is linked by a many-to-one relationship with brand group 352 which is linked to a category 354 which groups related brands together. Each category 354 may be associated with one or more high-level business groups represented by a global business unit (GBU) 356 or alternatively a business sector 358. Each category preferably includes an associated approval matrix (AMAT) technical standard 550. AMAT technical standard 550 is a template which includes a list of valid approvers for a given technical standard in a particular business. The global business unit information 356 may include associated current best approach (CBA) and standard operating procedures (SOP) 552 and 554, respectively, which may also be associated with regional level business groups represented by block 366. Plant information 364 identifies the manufacturing plant where materials are used or produced. Likewise, country information 360 identifies the country where particular products are sold or business is conducted. Countries may belong to one or more country groups 362 which are preferably organized by geographic region.

Figure 9:
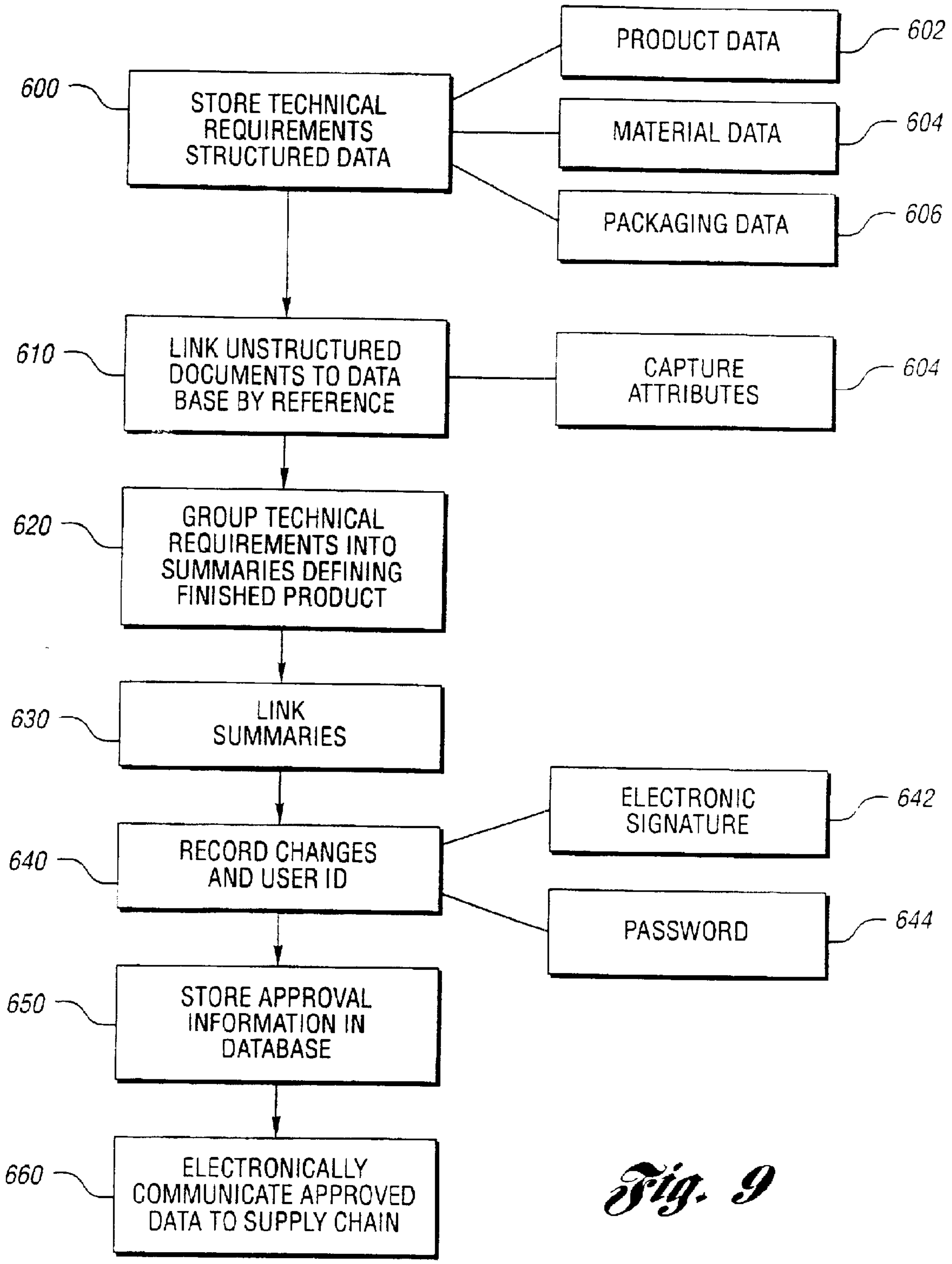
FIG. 9 is a block diagram illustrating operation of a system or method for managing product development according to one embodiment of the present invention.

FIG. 9 provides a flowchart illustrating operation of a system or method for managing product specific development according to one embodiment of the present invention. Block 600 represents storing of technical requirements data for a product in a structured relational database. In one embodiment, the technical requirements data includes product date 602, material data 604, and packaging data 606. Packaging data 606 is preferably grouped by data related to the end consumer, data related to an intermediate customer or distributor, and data related to transporting of consumer and/or customer units from a manufacturing plant. Preferably, the relational database (which may be a single database or distributed among related databases) contains draft, approved, and archived versions of various technical standards for use by product development personnel in providing a structured set of data output for use in a supply chain.

Unstructured documents are preferably linked to the relational database as represented by block 610. In one embodiment, unstructured documents are linked to the database by an appropriate reference, such as a path and file name reference. Unstructured documents may include text-based documents which are used to provide design requirements not amenable to a structure data format, such as test methods, process instructions, artwork, illustrations, and the like. Various attributes may be associated with the unstructured documents and stored in the relational database as represented generally by block 612.

Technical requirements data is then grouped into technical requirements summaries to define a finished product as represented by block 620. The summaries are linked as indicated by block 630 to facilitate using navigation among related technical requirement summaries which may include creation, review, approval, and distribution of various technical standards. Changes and/or approvals are recorded along with an associated user identification as represented by block 640. User identification may be in the form of an electronic signature 642 and/or password 644. Electronic communication and approval of data subsets such as those contained in the technical requirements summaries together with system validation and ongoing change control provide necessary support for products in regulated industries. Once a particular standard or technical requirement summary is approved, the associated approval information is stored in the database as represented by block 650. The approved standards are then electronically communicated to the supply chain for use in manufacturing and distributing the finished product as represented by block 660.

Figure 10:
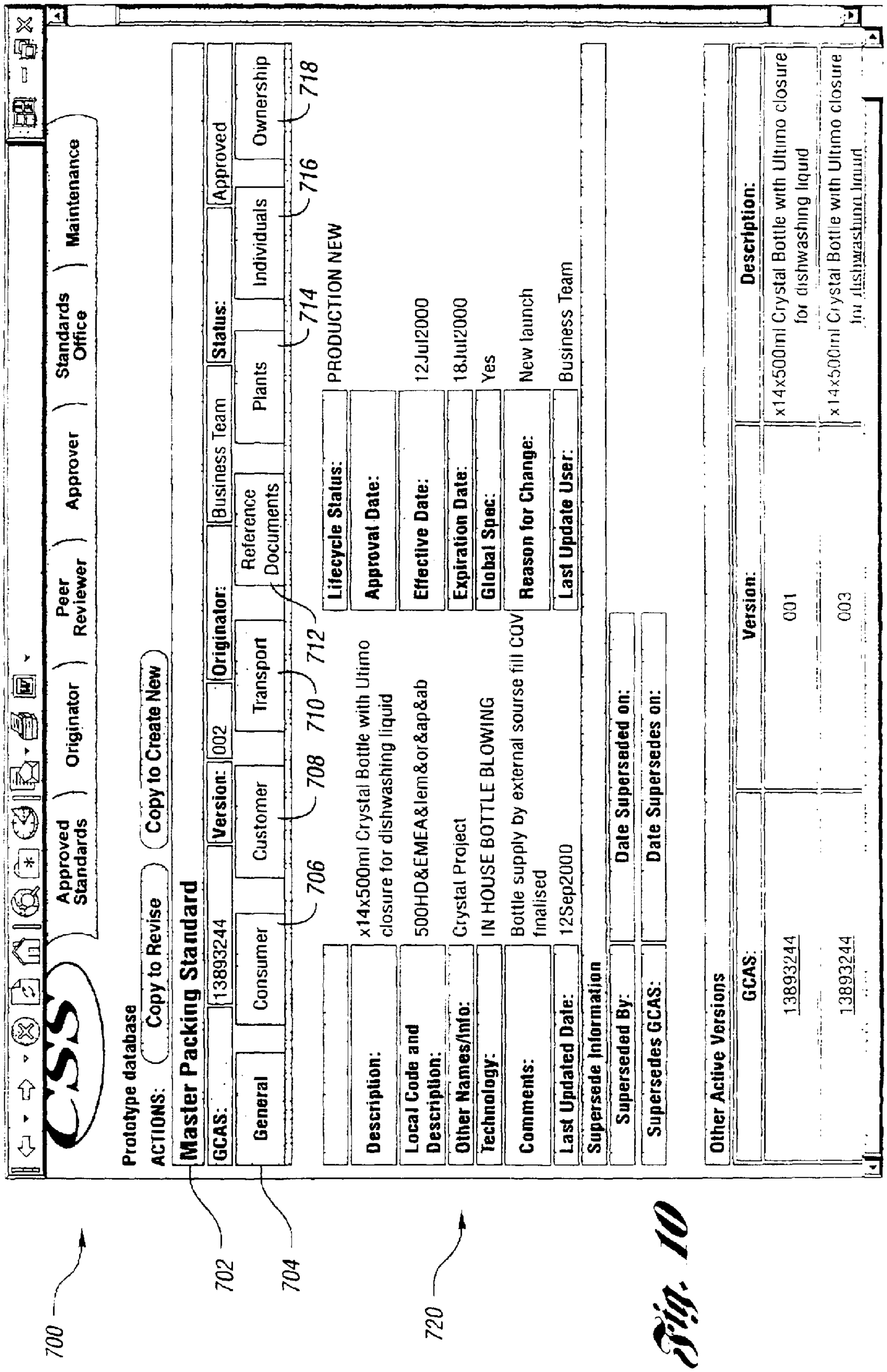
FIG. 10 illustrates a representative user interface for a master packing standard according to one embodiment of the present invention.

FIG. 10 illustrates a representative user interface for a system or method for managing product development according to one embodiment of the present invention. User interface 700 is preferably a browser-based interface such as provided by the Microsoft Internet Explorer, Netscape Navigator, or the like. User interface 700 is used to access structured data stored within the relational database according to the present invention. A representative master packing standard 702 includes submenus associated with various technical requirements data summary related to general data 704, consumer data 706, customer data 708, transport data 710, reference document 712, manufacturing plant data 714, individual packing standard data 716, and organizational or business-related data 718. General data 704 is displayed when selected as represented generally by reference numeral 720.

FIG. 11 illustrates consumer-related data associated with the master packing standard of FIG. 10. Consumer-level data 706 may include associated general data accessed by a link associated with menu option 730, component data accessed via menu option 732, and performance specifications accessed via menu option 734. Component data for the consumer level of the master packing standard is indicated generally by reference numeral 734. Component data 734 may include a material code 736, a description 738, a packaging size 740, unit of measure 742, quantity 744, a quantity unit of measure 746, and a comment field 748, for example.

Figure 12:
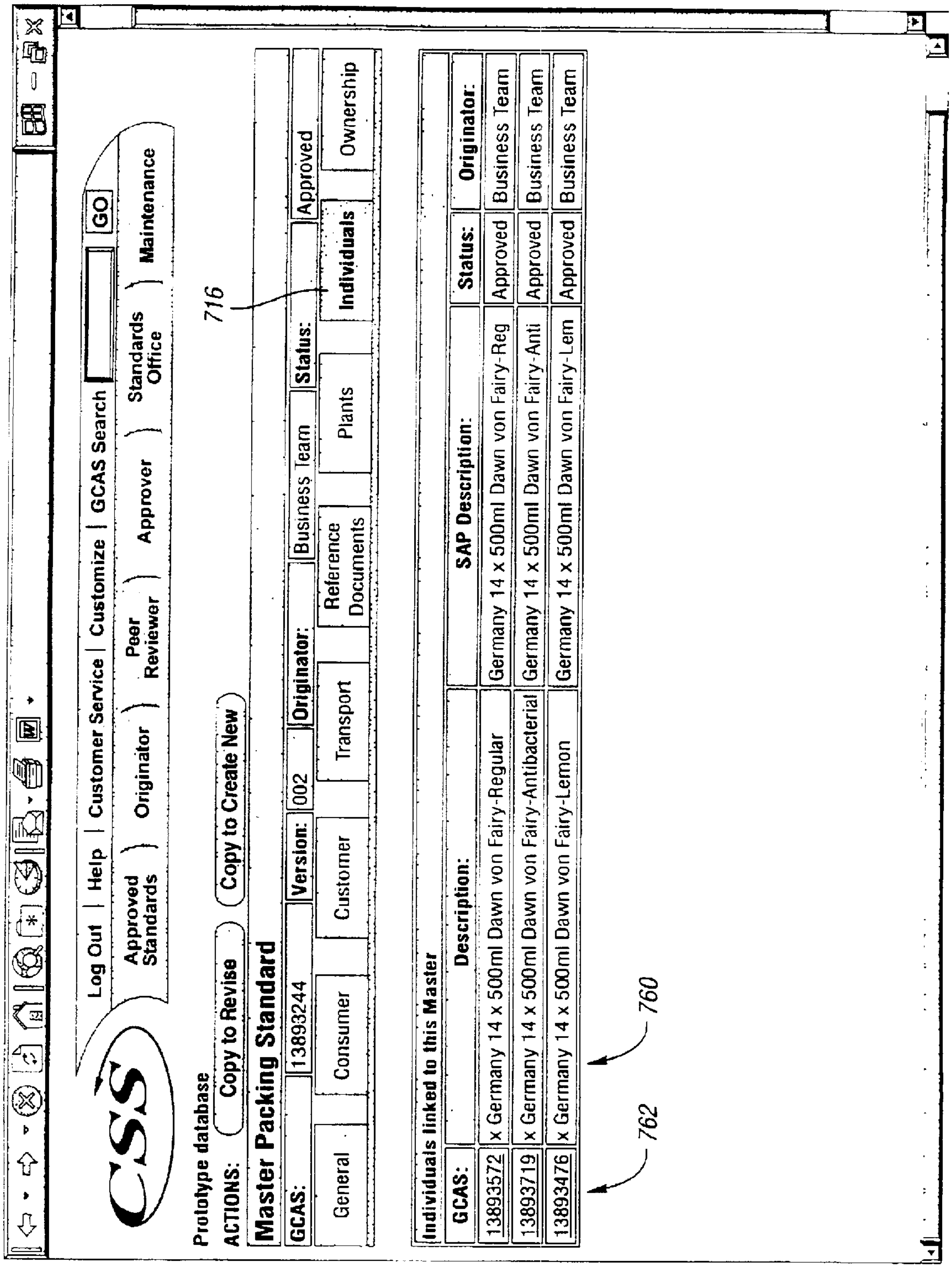
FIG. 12 illustrates individual packing standards linked to a master level packing standard according to one embodiment of the present invention.

FIG. 12 illustrates individual packing standards associated with the master packing standard of FIG. 10. The associated or linked individual packing standards are accessed via menu option 716. Each master packing standard may include one or more associated individual packing standards 760. More detailed information for each of the individual packing standards 760 may be accessed by an associated link represented generally by reference numeral 762.

FIG. 13 illustrates representative data associated with individual packing standards accessed via a link as described with reference to FIG. 12. Individual packing standard 770 includes submenus 772 similar to those described above with reference to the master packing standard. Representative general data 774 preferably includes brand information 776 for a particular product.

As illustrated in FIG. 14, individual packing standard 770 has associated menu 772 for accessing general, consumer, customer, transport, reference documents, plants, and ownership data. Consumer level data 780 may include associated submenu 782 for accessing general data, component level data, and performance specifications, for example. Component data 784 associated with the consumer level of the individual packing standard is indicated generally by reference numeral 786. Component data may include a material code 788, description 790, artwork code 792, package size 794, package unit of measure 796, quantity 798, quantity unit of measure 800, and comments 802, for example. As illustrated in FIG. 14, structured and unstructured data may be linked to facilitate user navigation among related information. For example, artwork code data 792 may include one or more links 804 to unstructured data used to define an/or display artwork associated with a particular product. In this example, artwork is linked by reference to an associated file and accessed by selecting the icon or menu item 804.

Figure 15:
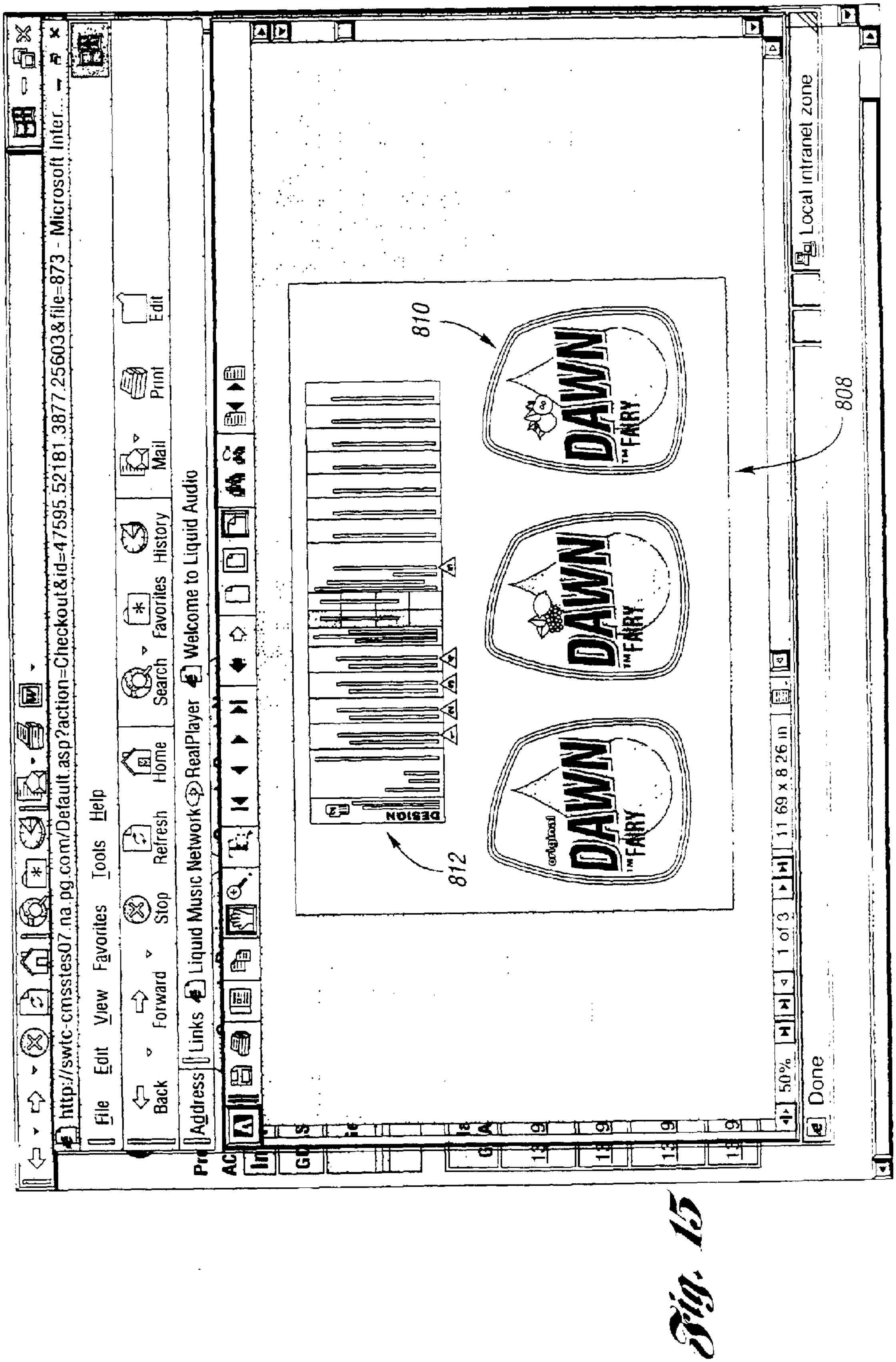
FIG. 15 illustrates a representative unstructured document containing artwork associated with the individual packing standard according to one embodiment of the present invention.

FIG. 15 illustrates representative unstructured data corresponding to the description or specification for artwork accessed by the link illustrated and described with reference to FIG. 14. In this implementation, brand information is associated with the individual packing standard. Because artwork is also associated with the brand level, it is preferably linked to the individual packing standard as well. As illustrated in FIG. 15, artwork 808 may include various graphic illustrations 810 in addition to text tool design specifications 812 depending upon the particular application or products.

Figure 16:
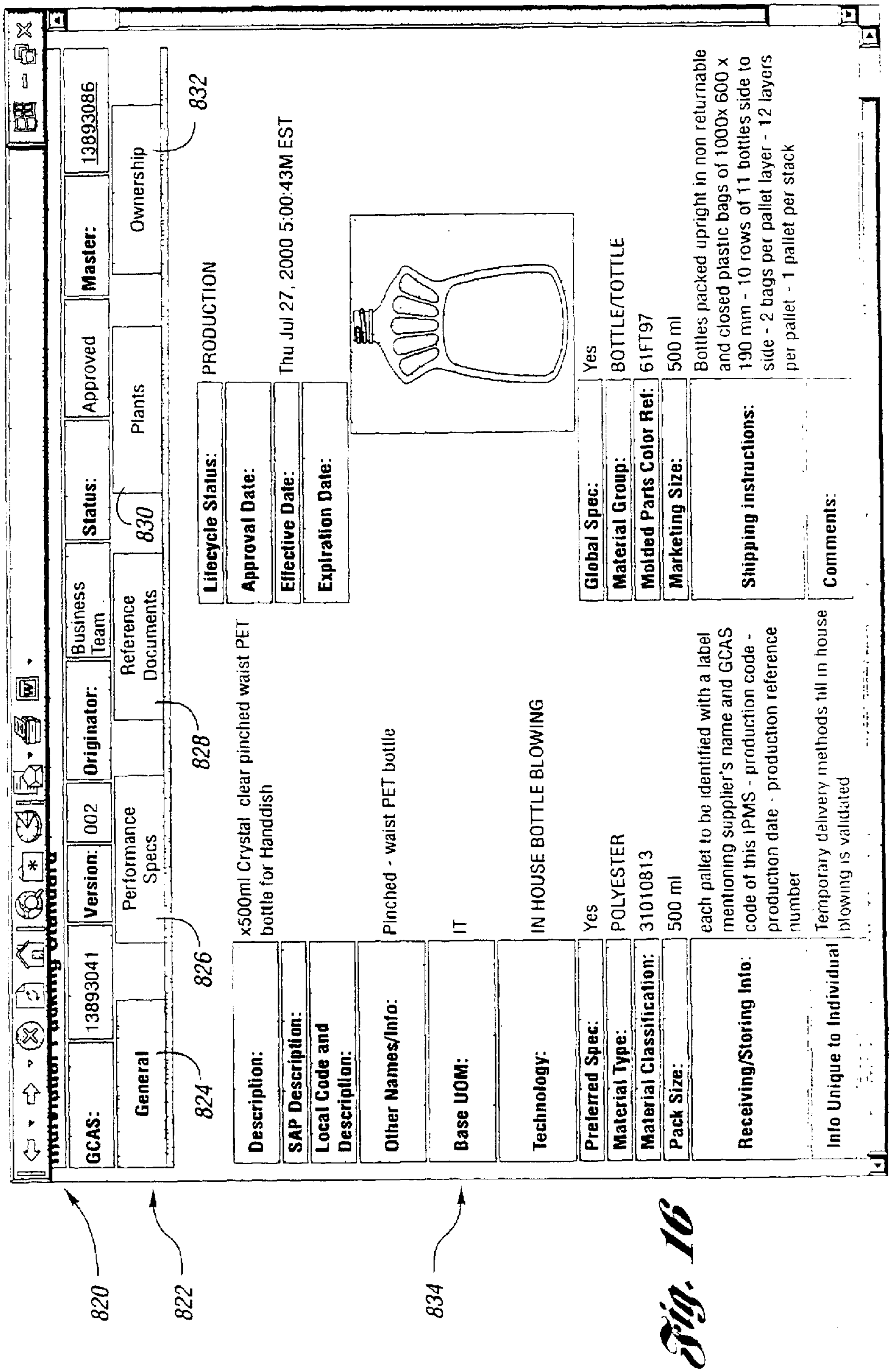
FIG. 16 illustrates data associated with an individual packing material specification according to one embodiment of the present invention.

FIG. 16 illustrates an individual package material standard which may be accessed by an associated link from the individual packing standard based on the material code 788 (FIG. 14). Individual packaging material standard 820 preferably includes associated information accessed by submenus 822. The associated information may be separated into categories corresponding to general data 824, performance specifications 826, reference documents 828, manufacturing plants 830, and business or organization ownership 832, for example. General information or data 824 is indicated generally by reference numeral 834.

FIG. 17 illustrates representative master and individual level performance specifications associated with an individual packaging material standard. Although illustrated and described in the context of an individual packaging material standard, performance specifications are preferably associated with various other product and package specifications, such as the formula cards, raw materials specifications, etc.

Individual packaging material standard 820 includes associated performance specifications accessed via menu option 826 and associated submenus 840. Submenus 840 may include entries or links for accessing related test method information 842, sampling information 844, values 846, and basis or rationale 848. Information associated with performance specification values 846 is displayed as indicated generally by reference numeral 850. Preferably, the information includes individual-level information 852 in addition to master-level information 854. Master-level information 854 provides commonality among related individual items while individual-level data 852 allows for customization of performance specifications for particular products. In addition, separation of data into master and individual levels allows individual review and approval of data by appropriate product development personnel.

Figure 18:
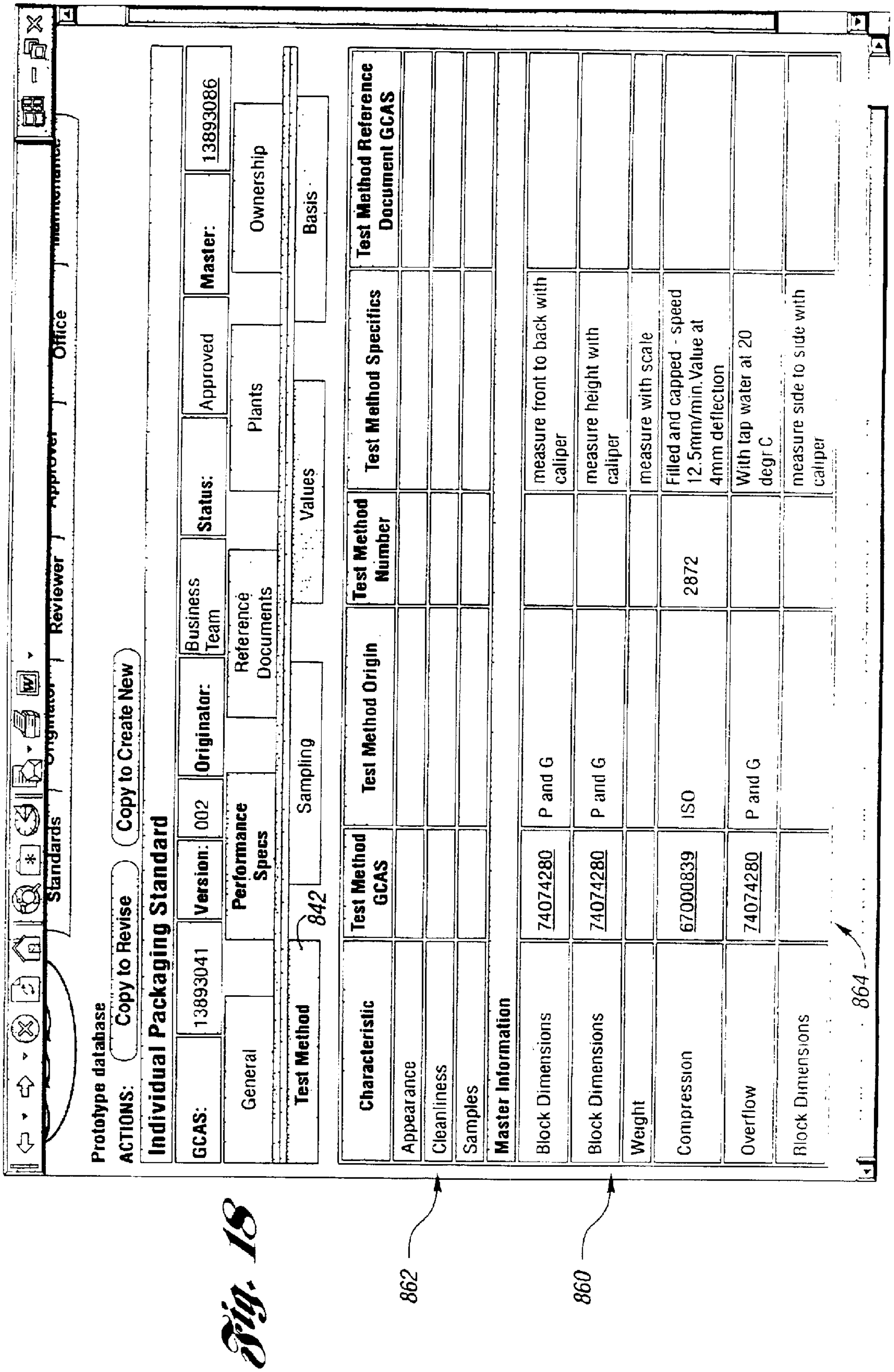
FIG. 18 illustrates linking of unstructured test method documents to an individual packing material standard according to one embodiment of the present invention.
Figure 19:
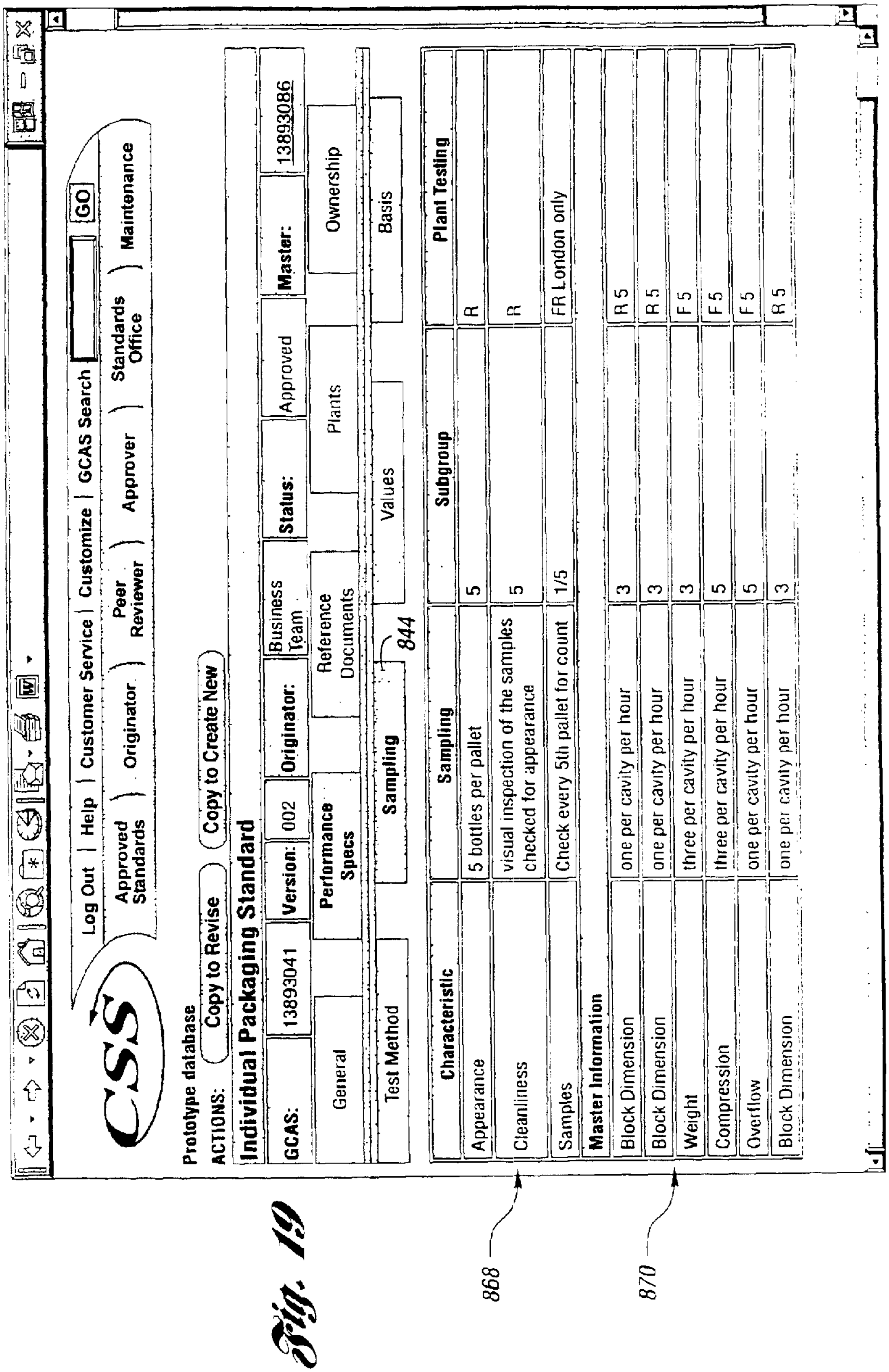
FIG. 19 illustrates sampling specifications for an individual packing material standard according to one embodiment of the present invention.

Various other information associated with the performance specifications for an individual packaging material standard is illustrated in FIGS. 18–20. Test method information 842 is preferably separated or divided into master level information 860 and individual level information 862 as illustrated in FIG. 18. Master level information 860 and/or individual level information 862 may include associated links 864 to unstructured data or documents which describe the test methods in greater detail. Various attributes associated with the unstructured data may be stored and displayed in structured form as illustrated, such as in a test method origin or test method number, for example. Sampling information associated with performance specifications of an individual packaging material standard are also preferably divided into individual level data 868 and master level data 870 as illustrated in FIG. 19. Likewise, basis data 848 is also separated into individual level data 880 and master level data 882 as illustrated in FIG. 20.

Figure 21:
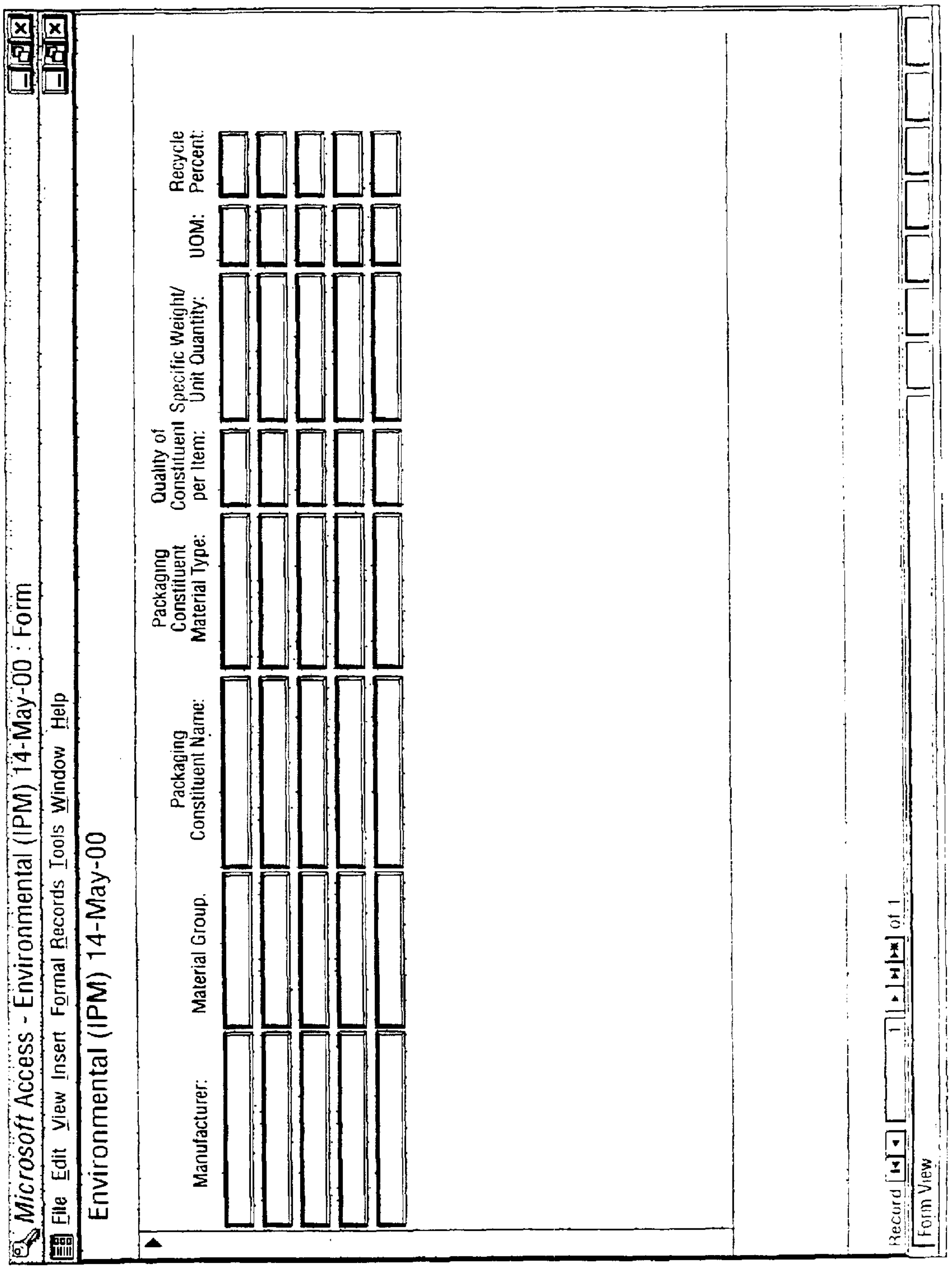
FIG. 21 illustrates environmental constituents data associated with an individual packaging material specification according to one embodiment of the present invention.

The individual packaging material standard may include associated reference documents. For example, FIG. 21 illustrates constituent data, which can vary by supplier, associated with an individual packaging material standard. This feature allows tracking of environment constituents for searching and reporting.

Figure 22:
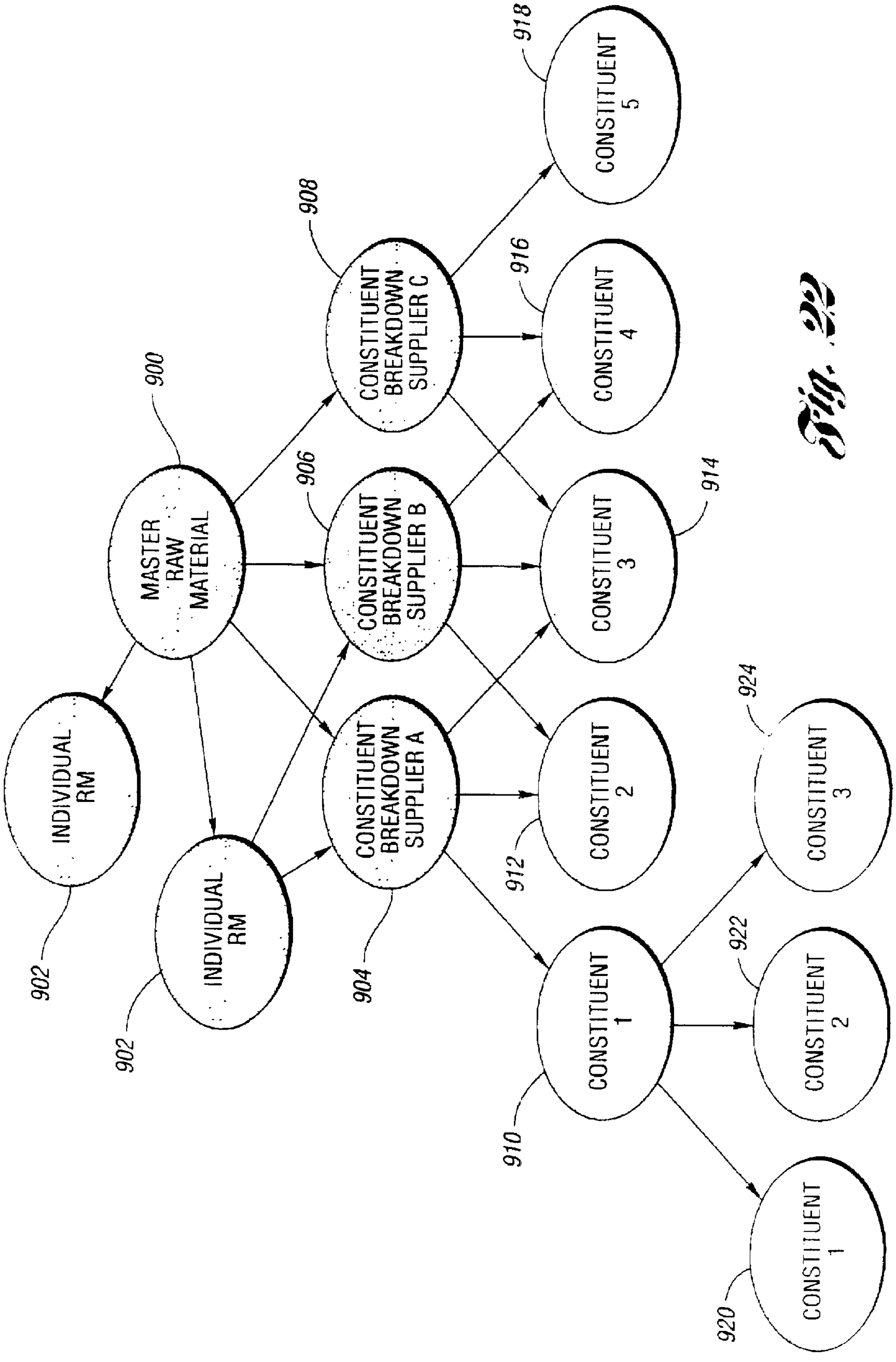
FIG. 22 is a block diagram illustrating relationships among master and individual levels of raw material data according to one embodiment of the present invention.

FIG. 22 illustrates representative relationships among raw materials and constituents which may be tracked according to the present invention. A particular master raw material 900 may include one or more associated individual raw materials 902. Each individual raw material 902 may include one or more constituents which may vary by supplier as represented by reference numerals 904, 906, and 908. In addition, a master raw material 900 may be directly linked to one or more constituent breakdowns as illustrated. A constituent breakdown for a first supplier represented by reference numeral 904 may include constituents 910, 912, and 914. For the same individual or master raw material, a different supplier may have an alternative constituent breakdown 906 which includes constituents 912, 914, and 916, for example. Constituents such as represented by reference numeral 910 may include one or more additional subconstituents 920, 922, and 924. The structured data approach according to the present invention facilitates tracking of individual constituents which may be used in various individual and/or master raw materials purchased from various suppliers. As such, the present invention facilitates more accurate reporting of environmental constituents and assessments of related fees, if any. Likewise, identification of common constituents may provide an improved economy of scale.

Figure 23:
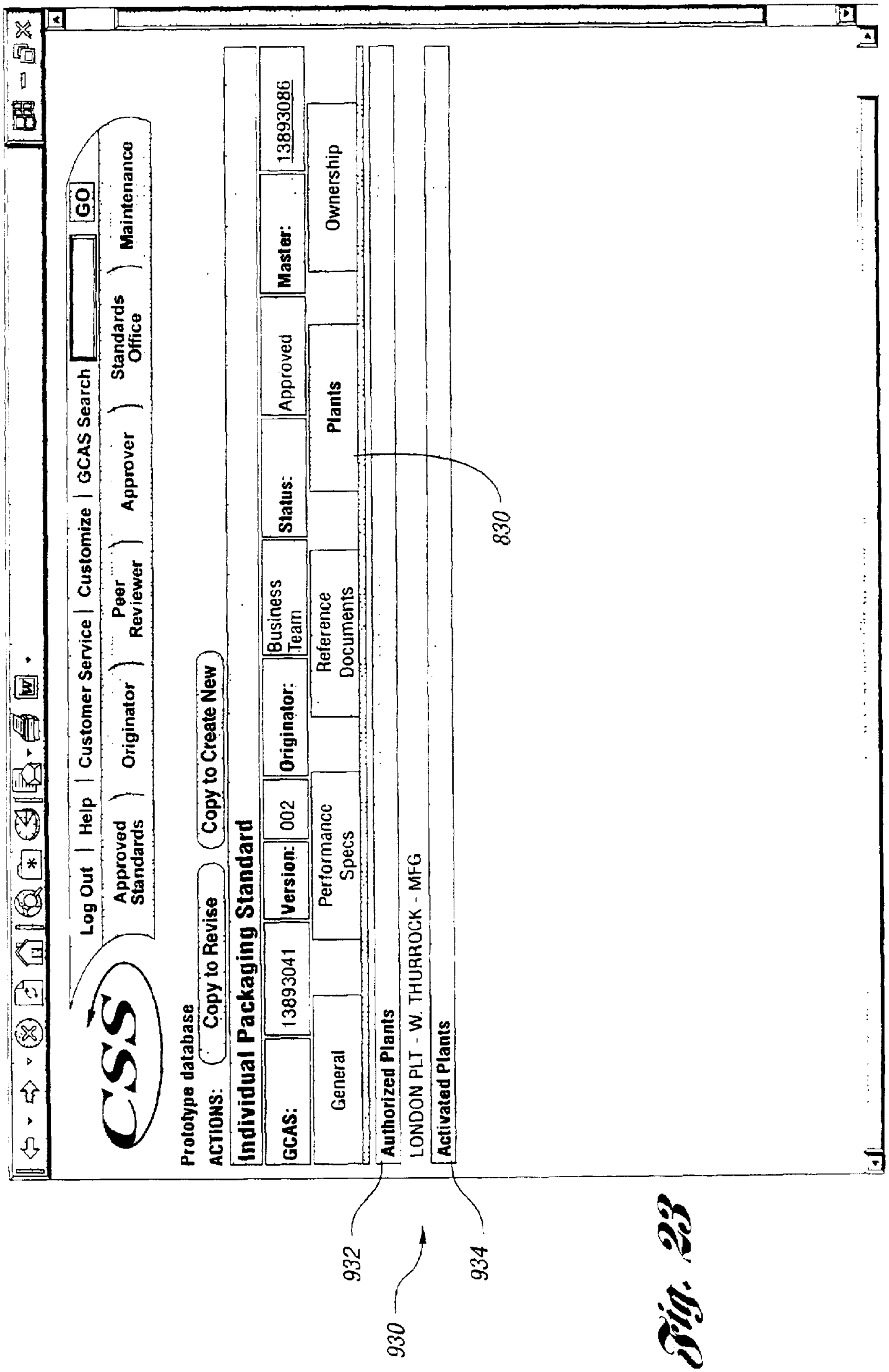
FIG. 23 illustrates authorized and activated locations associated with an individual packaging material standard according to one embodiment of the present invention.

FIG. 23 illustrates plant information associated with an individual packaging material standard according to one embodiment of the present invention. Plant information 830 preferably includes two levels of information as indicated generally by reference numeral 930. In this embodiment, plant information 830 includes manufacturing plant identification for authorized plants 932 and activated plants 934. Authorized plants 932 are those locations which are authorized to use a particular individual packaging material for research and development purposes. Activated plant data 934 includes identification of those locations using the individual packaging material for production.

FIG. 24 illustrates the results of a search to determine where a particular packaging material is used. The structured data approach of the present invention facilitates searching and reporting for each of the specifications or standards. For the example illustrated in FIG. 24, a search for a particular version of an individual packaging material standard displays associated codes 940, descriptions 942, finished product codes 944, and brand information 946. Of course, various other information associated with the individual packaging material standard and version may be displayed as desired. Likewise, a search may include one or more links to other information to facilitate use or navigation. For example, codes 940 and finished product codes 944 include associated links to the related information. Other links may be provided depending upon the particular product, standard, and/or application.

Figure 26:
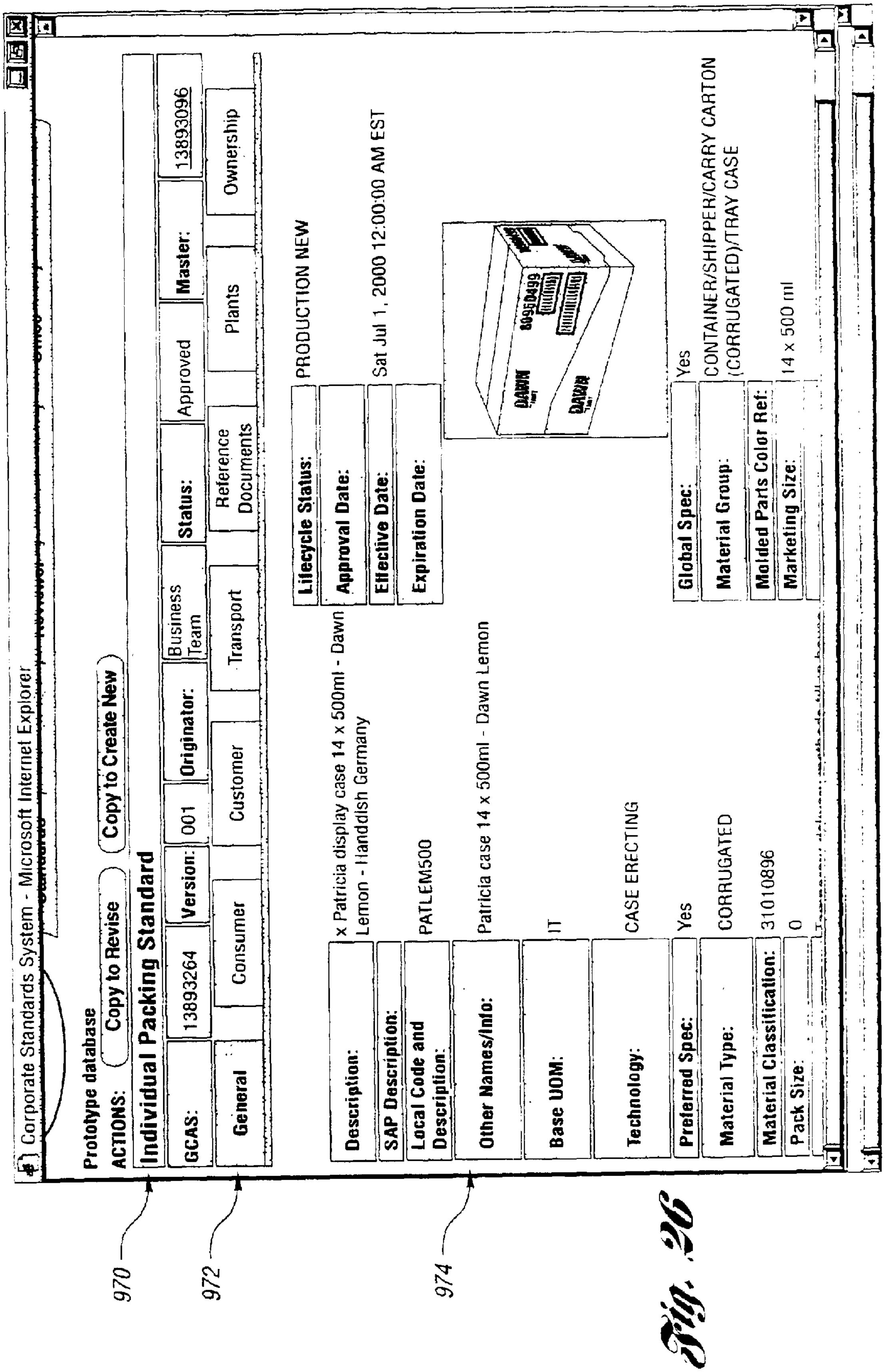
FIG. 26 illustrates data associated with an individual packaging material specification for an individual packing standard according to one embodiment of the present invention.
Figure 27:
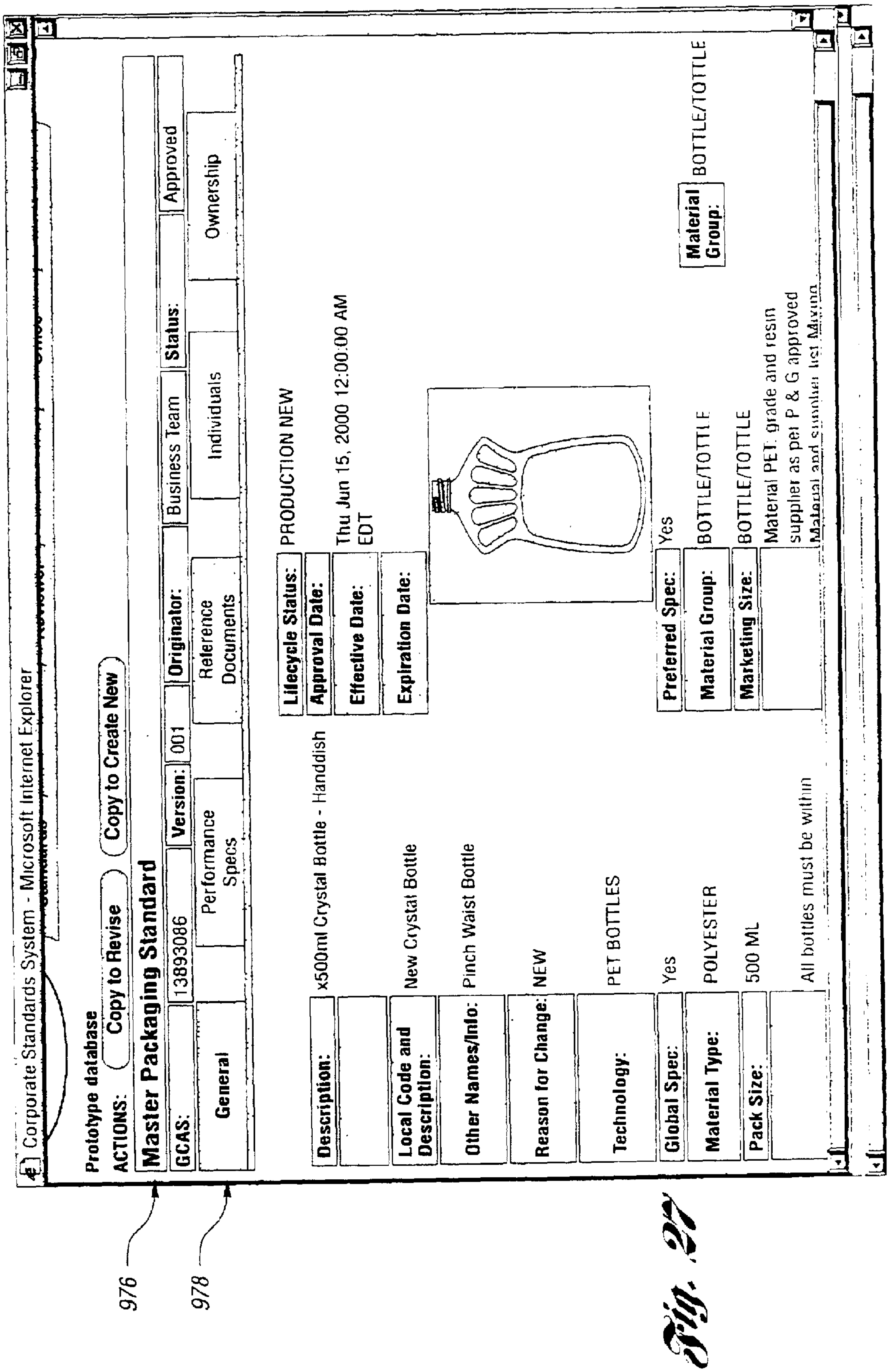
FIG. 27 illustrates data associated with a master packaging material specification according to one embodiment of the present invention.

FIG. 25 illustrates representative customer-level data for an individual packing standard according to one embodiment of the present invention. Customer level data is accessed via menu option 708. In this embodiment, a submenu 950 provides links for accessing general information 952, component information 954, and performance specification 956. Component information 954 is displayed as indicated generally by reference numeral 958. The component information 954 form the customer-level of the individual packing standard may include the material code, description, artwork code, package size and unit of measure, quantity and unit of measure, and comments. The material code may provide a link to associated individual packaging material standard as illustrated and described with reference to FIG. 26.

Individual packaging material standard 970 preferably includes associated information or standards accessed by submenu 972. General information associated with the customer-level data of the individual packaging material standard is indicated generally by reference numeral 974. As illustrated, information 974 includes various material specifications for the shipping materials associated with a particular product. Other related information including performance specifications, reference documents, manufacturing plants, and business or organization ownership may be accessed by corresponding menu items similar to those described above. Likewise, a representative master packaging material standard 976 includes related information separated or grouped according to category and accessed by menu 978.

Figure 29:
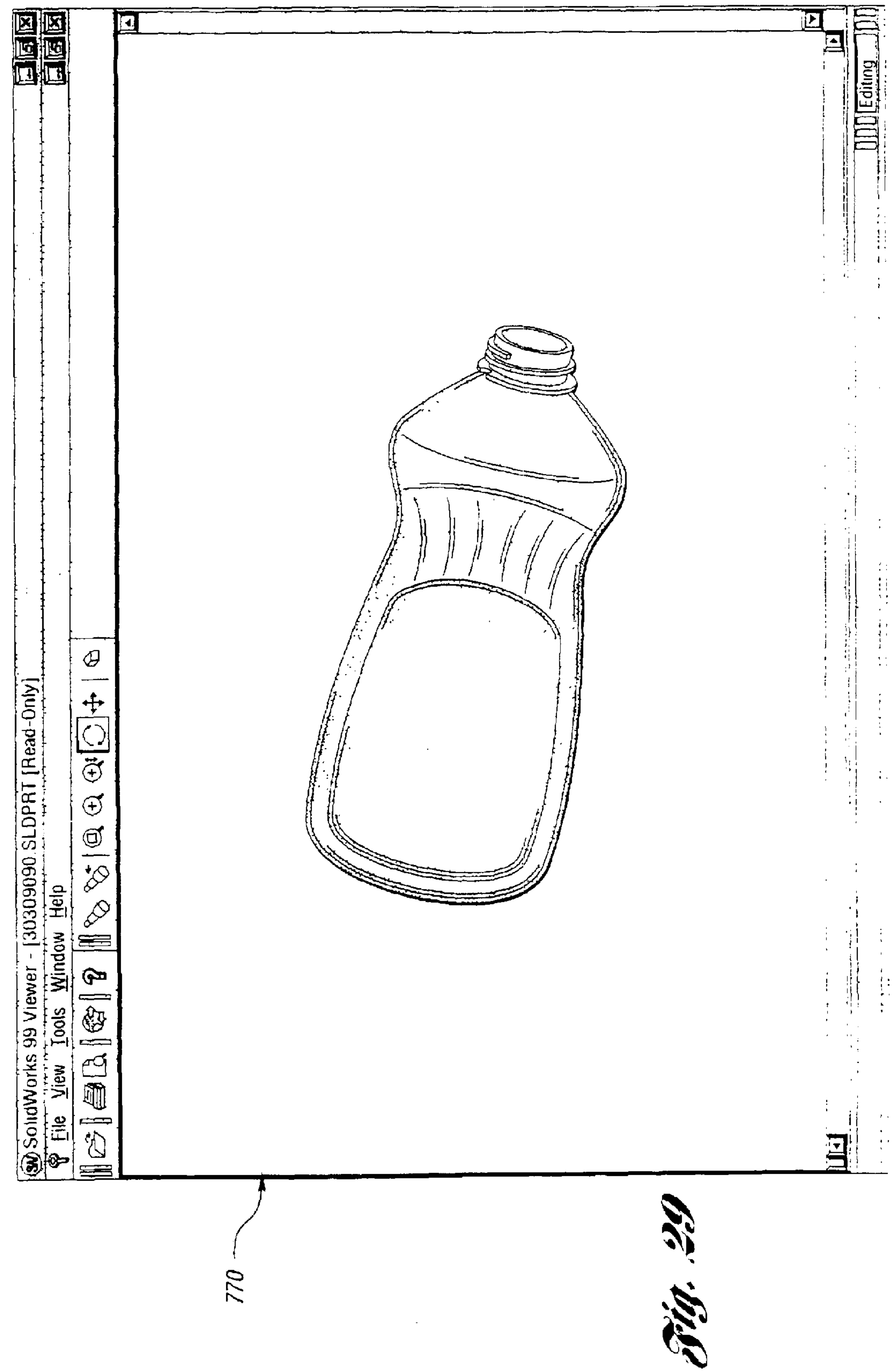
FIG. 29 illustrates a three-dimensional drawing file associated with the master packaging material specification of FIG. 28 according to one embodiment of the present invention.

FIG. 28 illustrates representative links to reference documents for a master packaging material standard according to one embodiment of the present invention. The associated reference documents for the master packaging material standard are accessed via menu selection 980. In this embodiment, reference documents include unstructured documents accessed by associated links 982. In addition, various attributes associated with the unstructured documents may be displayed in the structured database view. For example, the document type 984 and corresponding description 986 may be displayed along with the link to the referenced document. Unstructured documents may include three-dimensional drawings as illustrated in FIG. 29.

FIG. 30 illustrates a representative supplier approval matrix according to one embodiment of the present invention. The supplier approval matrix may include supplier information 990 in addition to approved use information 992. Having material supplier information linked to material name, usage, and clearance information allows a user to search for materials approved from a given supplier, or suppliers approved for a given material, or any of a number of powerful searches depending upon the particular application. Representative supplier information may include the manufacturer and location, a manufacturer classification, status, trade name, and related code, for example. Approved use information 992 may be linked to supplier information by manufacturer and location, for example. In addition, approved use information 992 may include business unit, product category, brand name, product name, and related information. Preferably, each specification or standard is linked to the supplier approval information for ease of user navigation, searching, and reporting.

Figure 31:
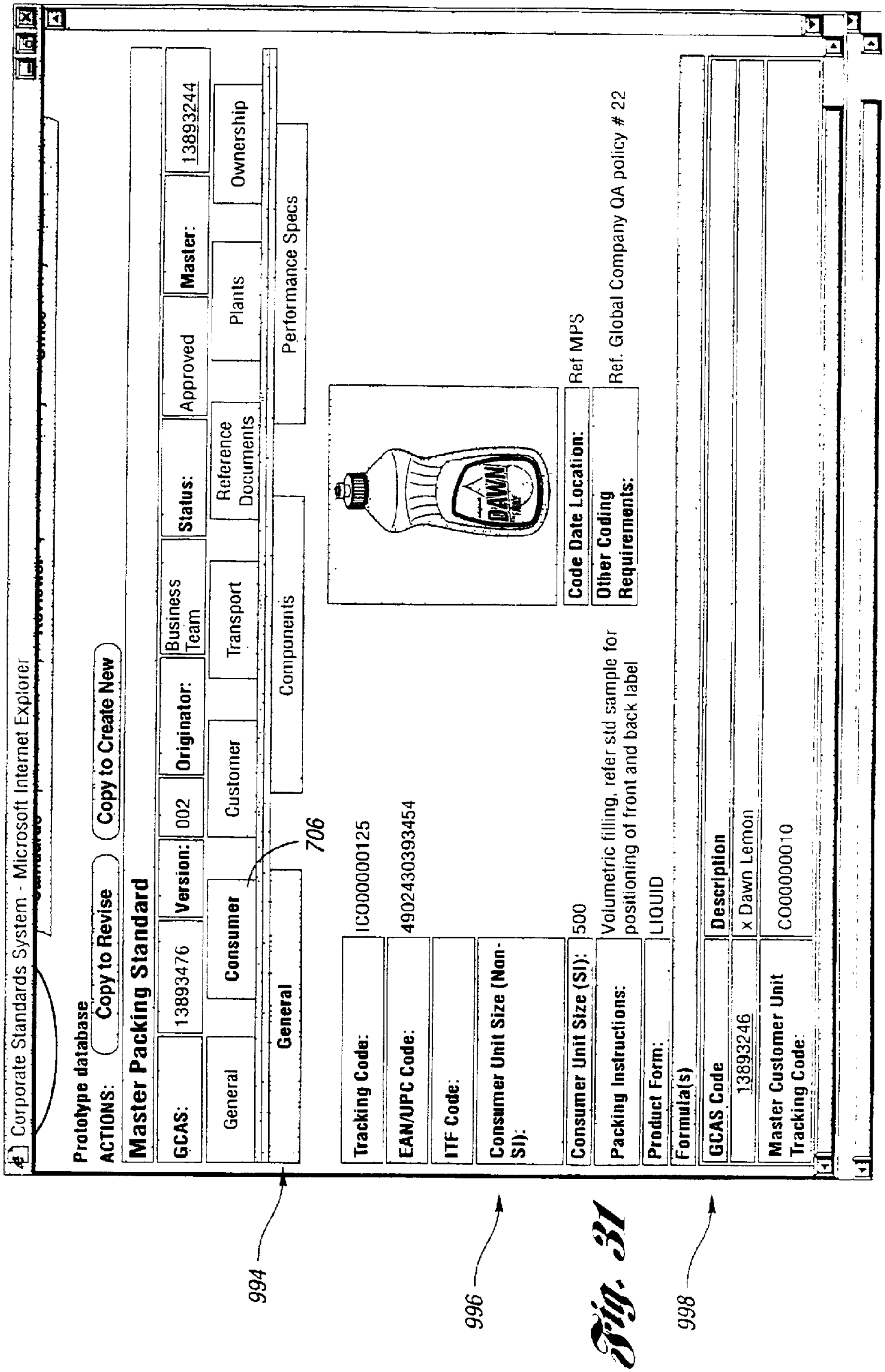
FIG. 31 illustrates consumer-level formula information for an individual packing standard according to one embodiment of the present invention.

Referring now to FIG. 31, representative consumer-level data is illustrated for an individual packing standard according to one embodiment of the present invention. The consumer-level data, accessed via menu option 706, may include data grouped or summarized by category and accessed by a submenu 994. In this embodiment, submenu 994 includes links for accessing general data, component data, and performance specifications. General data is represented by reference numeral 996 and includes various consumer units data such as the consumer unit size, packing instructions, product form, etc. In addition, formula information 998 may be provided in summary form with more detailed information accessed via an appropriate link which is provided by the code in this example.

Figure 32:
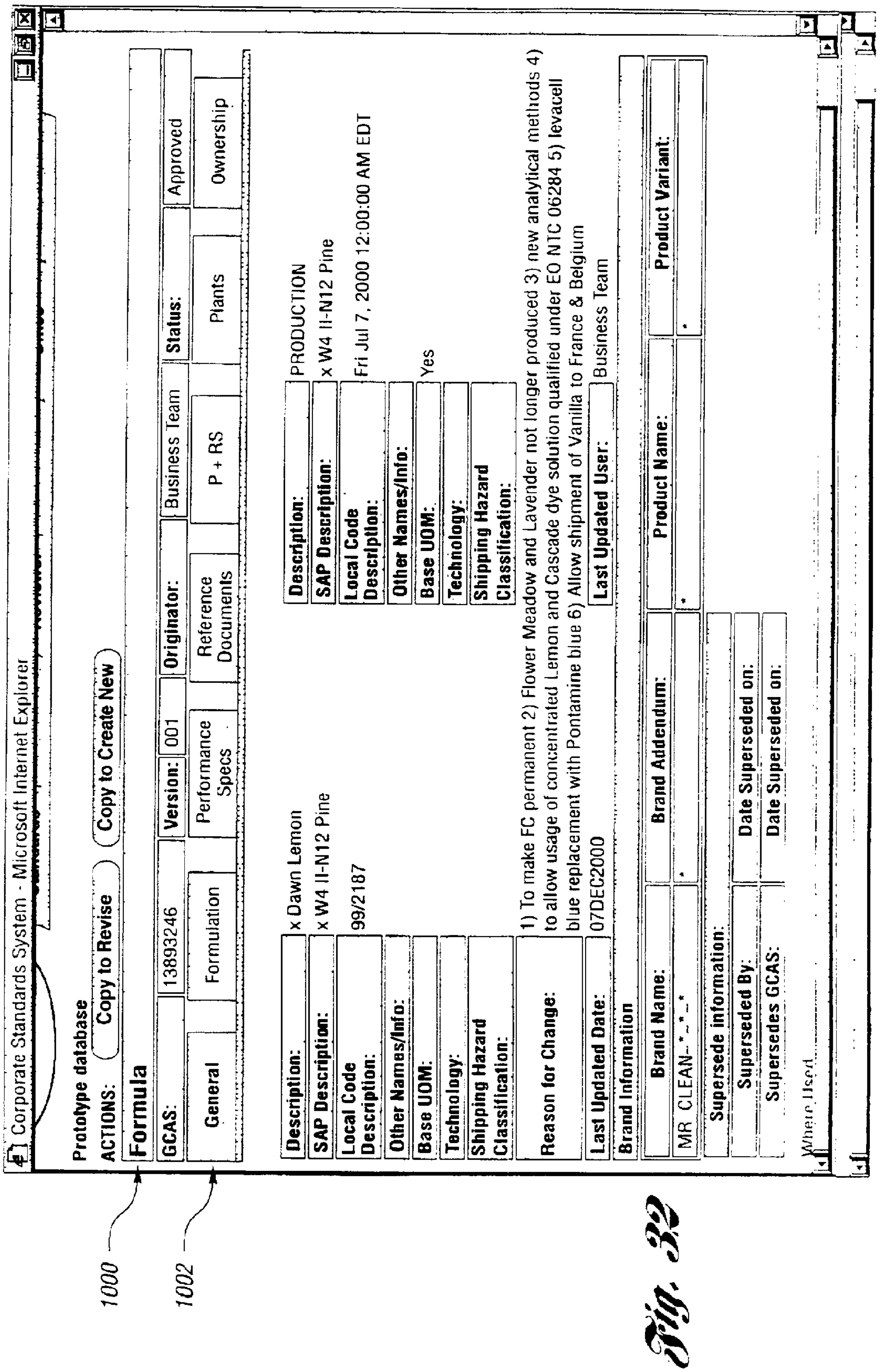
FIG. 32 illustrates product formula information according to one embodiment of the invention.

FIG. 32 illustrates the detailed formula information accessed via the code link illustrated and described with reference to FIG. 31. As illustrated, the formula, raw materials, raw material suppliers, constituents, and the like are summarized with appropriate links provided to facilitate navigation among various standards in related information. Formula card or standard 1000 includes a submenu 1002 to access related data and standards. In this embodiment, submenu 1002 includes links to access general information, formulation information, performance specifications, reference documents, Professional and Regulatory Services, manufacturing plants, and organizational unit ownership. Of course, various other data and/or menus may be provided depending upon the particular application and/or product.

As such, the present invention provides a flexible approach to management of product development data. The structured data approach, which accommodates unstructured documents linked by reference, may be used across diverse businesses and geographic regions. Use of master and individual level data allows alignment of content to reduce redundant data entry. In addition, division of data into several levels facilitates electronic review and approval of common and individual requirements or specifications for particular products or groups of products. The structured data approach facilitates cross-checking of various elements of a particular product to ensure overall quality. In addition, data may be grouped into a virtual customized document which can be viewed on a screen or printed by a user to accommodate a variety of user needs. This is particularly useful for those who are less comfortable with computer-related technology. The various data summarized and technical requirements standards is linked by reference to provide complete integration of product and package development data. Electronic searchability, communication, and approval of data may improve efficiency of the product development process, particularly for consumer goods.

While the best mode for carrying out the invention has been described in detail, those familiar with the art to which this invention relates will recognize various alternative designs and embodiments for practicing the invention as defined by the following claims.

What is claimed:

1. A method for managing product development, the method comprising:

storing technical requirements data for a product including product data, material data, and packaging data in a structured relational database;

linking unstructured documents to the technical requirements data within the structured relational database;

grouping technical requirements data into technical requirements summaries to define a finished product;

linking the technical requirements summaries for the finished product to facilitate user navigation and searchability among related technical requirements summaries;

recording changes made to the technical requirements data and associated user identification information;

storing approval information for the technical requirements data in the relational database; and electronically communicating approved technical requirements data for use in manufacturing and distributing the finished product.

2. The method of claim 1 wherein the step of storing approval information comprises storing an electronic signature which uniquely identifies a user.

3. The method of claim 1 wherein the step of linking unstructured documents comprises associating structured attributes with the unstructured documents and storing the associated structured attributes in the relational database.

4. The method of claim 1 further comprising:

validating the technical requirements data during entry relative to previously entered technical requirements data based on predetermined rules.

5. The method of claim 1 wherein the technical requirements summaries include at least two levels of summaries, the method further comprising:

storing separate approval information for each level of technical requirements summaries.

6. The method of claim 5 wherein the levels of summaries include at least a master level approved by a first user and an individual level approved by the same user or by a different user.

7. The method of claim 5 wherein the levels of summaries include at least a master level and a plurality of individual level summaries associated with at least one master level summary.

8. The method of claim 1 wherein the technical requirements summaries include a formula card, a raw material specification, a packing standard, a packaging material specification, a supplier approval, and an approved country matrix.

9. The method of claim 1 further comprising:

limiting access to subsets of technical requirements data based on a user identification and password.

10. The method of claim 1 wherein the step of grouping technical requirements data comprises grouping data to form different technical requirements summaries based on requirements or practices of a particular geographic region.

11. The method of claim 1 wherein the step of grouping technical requirements data comprises combining different technical requirements data to form technical requirements summaries based on requirements or practices of business units within an organization.

12. The method of claim 1 wherein the step of storing technical requirements data comprises storing draft versions of the technical requirements data.

13. The method of claim 1 wherein the step of storing technical requirements data comprises storing approved technical requirements data.

14. The method of claim 1 wherein the step of storing technical requirements data comprises storing archived technical requirements data.

15. The method of claim 1 wherein the step of storing technical requirements data comprises:

storing draft, approved, and archived versions of the technical requirements data; and linking the draft, approved, and archived versions of the technical requirements within the relational database.

16. The method of claim 1 wherein the step of grouping technical requirements data into technical requirements summaries comprises grouping product components, product amounts, in-process product measures, and finished product measures into a formula card.

17. The method of claim 1 wherein the step of grouping technical requirements data into technical requirements summaries comprises grouping package components, package amounts, in-process package measures, and finished package measures into a packing standard.

18. The method of claim 17 wherein the packing standard comprises consumer level data, customer level data, and transport level data.

19. The method of claim 18 wherein the consumer level data comprises primary package data and a product formula.

20. The method of claim 18 wherein a single business group develops the consumer level data, the customer level data, and the transport level data.

21. The method of claim 18 further comprising creating and approving each level of data within a different business group.

22. The method of claim 1 wherein the step of grouping technical requirements data into technical requirements summaries comprises grouping product constituents and associated levels for a given raw and packaging material into a raw and packaging material specification.

23. The method of claim 22 further comprising:

separating the raw and packaging material specification into a master level and an individual level, the master level including technical information and the individual level containing logistical and shipping information.

24. The method of claim 1 wherein the step of grouping technical requirements data into technical requirements summaries comprises grouping packaging constituents and associated levels for a given packaging material into a packaging material specification.

25. The method of claim 24 further comprising:

separating the packaging material specification into a master level containing technical information and an individual level containing logistical and shipping information.

26. The method of claim 1 wherein the step of grouping technical requirements data into technical requirements summaries comprises grouping raw material data by approved supplier.

27. The method of claim 1 wherein the step of grouping technical requirements data into technical requirements summaries comprises grouping finished products by approved country of sale.

28. The method of claim 1 wherein the step of linking unstructured documents comprises linking text documents to the technical requirements data.

29. The method of claim 28 wherein the text documents specify test methods, process standards, general standards, standard operating procedures, or recommended procedures.

30. The method of claim 1 wherein the step of linking unstructured documents comprises linking artwork for product packaging to the technical requirements data.

31. A system for managing product development, the system comprising:

a technical requirements data module for a product including product data, material data, and packaging data in a structured relational database;

a module for linking unstructured documents to the technical requirements data within the relational database;

a module for grouping technical requirements data into technical requirements summaries to define a finished product;

a module for linking the technical requirements summaries for the finished product to facilitate user navigation among related technical requirements summaries;

a module for recording changes made to the technical requirements data and associated user identification information;

a module for storing approval information for the technical requirements data in the relational database; and a module for electronically communicating approved technical requirements data for use in manufacturing and distributing the finished product.

32. The system of claim 31 wherein the module for storing approval information stores an electronic signature which uniquely identifies a user.

33. The system of claim 31 wherein the module for linking unstructured documents associates structured attributes with the unstructured documents and stores the associated structured attributes in the relational database.

34. The system of claim 31 wherein the technical requirements summaries include at least two levels of summaries, the system further comprising:

means for storing separate approval information for each level of technical requirements summaries.

35. The system of claim 34 wherein the levels of summaries include at least a master level approved by a first user and an individual level approved by a second user.

36. The system of claim 34 wherein the levels of summaries include at least a master level and a plurality of individual level summaries associated with at least one master level summary.

37. The system of claim 31 wherein the technical requirements summaries include a formula card, a raw material specification, a packing standard, a packaging material specification, and a supplier approval and approved country matrix.

38. The system of claim 31 further comprising:

a module for limiting access to subsets of technical requirements data based on a user identification and password.

39. The system of claim 31 wherein the module for grouping technical requirements data groups data to form different technical requirements summaries based on requirements or practices of a particular geographic region.

40. The system of claim 31 wherein the technical requirements data module includes draft versions of the technical requirements data.

41. The system of claim 32 wherein the technical requirements data module includes draft, approved, and archived versions of the technical requirements data;

wherein the draft, approved, and archived versions of the technical requirements are linked within the relational database.

42. The system of claim 31 method of claim 1 wherein the module for grouping technical requirements data into technical requirements summaries groups product components, product amounts, in-process product measures, and finished product measures into a formula card.

43. The system of claim 31 wherein the module for grouping technical requirements data into technical requirements summaries groups package components, package amounts, in-process product measures, and finished package measures into a packing standard.

44. The system of claim 43 wherein the packing standard comprises consumer level data, customer level data, and transport level data.

45. The system of claim 44 wherein the consumer level data comprises primary package data and a link to a product formula.

46. The system of claim 31 wherein the module for grouping technical requirements data into technical requirements summaries groups product constituents and associated levels for a given raw material into a raw material specification.

47. The system of claim 46 wherein the module for grouping technical requirements data creates a master level raw materials specification and an individual level raw materials specification, the master level including technical information and the individual level containing logistical and shipping information, the master and individual levels being individually reviewed and approved.

48. The system of claim 31 wherein the module for grouping technical requirements data into technical requirements summaries groups raw and packaging constituents and associated levels for a given raw and packaging material into a packaging material specification.

49. The system of claim 48 wherein the module for grouping technical requirements creates a master level material specification containing technical information and an individual level containing logistical and shipping information.

50. The system of claim 31 wherein the module for grouping technical requirements data into technical requirements summaries groups raw material data by approved supplier.

51. The system of claim 31 wherein the module for grouping technical requirements data into technical requirements summaries groups finished products by approved country of sale.

52. The system of claim 31 wherein the module for linking unstructured documents links text documents to the technical requirements data by reference to a stored file containing at least one text document.

53. The system of claim 52 wherein the text documents specify test methods, process standards, general standards, standard operating procedures, or recommended procedures.

54. The system of claim 31 wherein the module for linking unstructured documents links artwork for product packaging to the technical requirements data by reference to a stored file containing associated artwork specifications or graphics.

55. A computer readable storage medium having stored data representing instructions executable by a computer to manage product development, the computer readable storage medium comprising:

instructions for storing technical requirements data for a product including product data, material data, and packaging data in a structured relational database;

instructions for linking unstructured documents to the technical requirements data within the structured relational database;

instructions for grouping technical requirements data into technical requirements summaries to define a finished product;

instructions for linking the technical requirements summaries for the finished product to facilitate user navigation among related technical requirements summaries;

instructions for recording changes made to the technical requirements data and associated user identification information;

instructions for storing approval information for the technical requirements data in the relational database; and instructions for electronically communicating approved technical requirements data for use in manufacturing and distributing the finished product.

56. The computer readable storage medium of claim 55 wherein the instructions for storing approval information comprise instructions for storing an electronic signature which uniquely identifies a user.

57. The computer readable storage medium of claim 55 wherein the instructions for linking unstructured documents comprise instructions for associating structured attributes with the unstructured documents and storing the associated structured attributes in the relational database.

58. The computer readable storage medium of claim 55 further comprising:

instructions for validating the technical requirements data during entry relative to previously entered technical requirements data based on predetermined rules.

59. The computer readable storage medium of claim 55 wherein the technical requirements summaries include at least two levels of summaries, the computer readable storage medium further comprising:

instructions for storing separate approval information for each level of technical requirements summaries.

60. The computer readable storage medium of claim 59 wherein the levels of summaries include at least a master level approved by a first user and an individual level approved by the first user or a second user.

61. The computer readable storage medium of claim 59 wherein the levels of summaries include at least a master level and a plurality of individual level summaries associated with at least one master level summary.

62. The computer readable storage medium of claim 55 wherein the technical requirements summaries include a formula card, a raw material specification, a packing standard, a packaging material specification, a supplier approval, and an approved country matrix.

63. The computer readable storage medium of claim 55 further comprising:

instructions for limiting access to subsets of technical requirements data based on a user identification and password.

64. The computer readable storage medium of claim 55 wherein the instructions for grouping technical requirements data comprise instructions for grouping data to form different technical requirements summaries based on requirements or practices of a particular geographic region.

65. The computer readable storage medium of claim 55 wherein the instructions for grouping technical requirements data comprise instructions for combining different technical requirements data to form technical requirements summaries based on requirements or practices of business units within an organization.

66. The computer readable storage medium of claim 55 wherein the instructions for storing technical requirements data comprise instructions for storing draft versions of the technical requirements data.

67. The computer readable storage medium of claim 55 wherein the instructions for storing technical requirements data comprise instructions for storing approval information associated with the technical requirements data.

68. The computer readable storage medium of claim 55 wherein the instructions for storing technical requirements data comprise:

instructions for storing draft, approved, and archived versions of the technical requirements data; and instructions for linking the draft, approved, and archived versions of the technical requirements within the relational database.

69. The computer readable storage medium of claim 55 wherein the instructions for grouping technical requirements data into technical requirements summaries comprise instructions for grouping product components, product amounts, in-process product measures, and finished product measures into a formula card.

70. The computer readable storage medium of claim 55 wherein the instructions for grouping technical requirements data into technical requirements summaries comprise instructions for grouping package components, package amounts, in-process product measures, and finished package measures into a packing standard.

71. The computer readable storage medium of claim 70 wherein the packing standard comprises consumer level data, customer level data, and transport level data.

72. The computer readable storage medium of claim 55 wherein the instructions for grouping technical requirements data into technical requirements summaries comprise instructions for grouping product constituents and associated levels for a given raw or package material into a raw or package material specification, respectively.

* * * * *